United States Patent
Kogan et al.

(10) Patent No.: US 9,424,080 B2
(45) Date of Patent: Aug. 23, 2016

(54) SYSTEMS AND METHODS FOR UTILIZING FUTURES FOR CONSTRUCTING SCALABLE SHARED DATA STRUCTURES

(71) Applicant: Oracle International Corporation, Redwood City, CA (US)

(72) Inventors: Alex Kogan, Needham, MA (US); Maurice P. Herlihy, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 53 days.

(21) Appl. No.: 14/502,779

(22) Filed: Sep. 30, 2014

(65) Prior Publication Data

US 2016/0092265 A1    Mar. 31, 2016

(51) Int. Cl.
*G06F 9/46* (2006.01)
*G06F 9/48* (2006.01)

(52) U.S. Cl.
CPC .................... *G06F 9/4843* (2013.01)

(58) Field of Classification Search
CPC .................................................. G06F 9/4843
USPC ......................................................... 718/102
See application file for complete search history.

(56) References Cited

PUBLICATIONS

Liskov et al., "Promises: Linguistic Support for Efficient Asynchronous Procedure Calls in Distributed Systems," 1988, ACM, p. 260-267.*
Halstead, R. H. Multilisp: A Language for Concurrent Symbolic Computation. ACM Trans.Program. Lang. Syst. 7,4 (Oct. 1985), 501-538.
Harris, T. L. A pragmatic implementation of non-blocking linked-lists. In Proceedings of the 15th International Conference on Distributed Computing (London, UK, UK, 2001), DISC'01, Springer-Verlag, pp. 300-314.
Herlihy, M. P., and Wing, J. M. Linearizability: a correctness condition for concurrent objects. ACM Trans. Program. Lang. Syst. 12,3 (Jul. 1990), 463-492.
Michael, M. M., and Scott, M. L. Simple, fast, and practical non-blocking and blocking concurrent queue algorithms. In Proceedings of the Fifteenth Annual ACM Symposium on Principles of Distributed Computing (New York, NY, USA, 1996), PODC '96, ACM, pp. 267-275.
Scherer, W. N., and Scott, M. L. Nonblocking concurrent data structures with condition synchronization. In DISC (2004), pp. 174-187.
Treiber, R. Systems Programming: Coping with Parallelism. Research Report RJ. International Business Machines Incorporated, Thomas J. Watson Research Center, 1986, pp. 1-42.
Welc, A., Jagannathan, S., and Hosking, A. Safe futures for java. In Proceedings of the 20th Annual ACM SIGPLAN Conference on Object-oriented Programming, Systems, Languages, and Applications (New York, NY, USA, 2005), OOPSLA '05, ACM, pp. 439-453.

* cited by examiner

*Primary Examiner* — Qing Chen
(74) *Attorney, Agent, or Firm* — Robert C. Kowert; Meyertons, Hood, Kivlin, Kowert & Goetzel, P.C.

(57) ABSTRACT

A multithreaded application that includes operations on a shared data structure may exploit futures to improve performance. For each operation that targets the shared data structure, a thread of the application may create a future and store it in a thread-local list of futures (under weak or medium futures linearizability policies) or in a shared queue of futures (under strong futures linearizability policies). Prior to a thread evaluating a future, type-specific optimizations may be performed on the list or queue of pending futures. For example, futures may be sorted temporally or by key, or multiple operations indicated in the futures may be combined or eliminated. During an evaluation of a future, a thread may compute the results of the operations indicated in one or more other futures. The order in which operations take effect and the optimization operations performed may be dependent on the futures linearizability policy.

20 Claims, 13 Drawing Sheets

SYSTEMS AND METHODS FOR UTILIZING FUTURES FOR CONSTRUCTING SCALABLE SHARED DATA STRUCTURES

BACKGROUND

1. Field of the Disclosure

This disclosure relates generally to shared data structures, and more particularly to systems and methods for utilizing futures to improve performance of multicore systems that utilize long-lived shared data structures.

2. Description of the Related Art

A future is a data object that represents a promise to deliver the result of an asynchronous computation when it is ready. Futures are considered an attractive way to manage parallel computations in that they are simple to use, and they lend themselves well to efficient scheduling mechanisms such as work-stealing. A future's value is calculated sometime between when that future is created and when it is evaluated. Futures were originally proposed as benign annotations for side-effect-free computations that reference shared objects. Since these futures were short-lived tasks without side effects, it was impossible to observe when these computations actually happened. As originally proposed, futures were untyped and implicit. In other words, any object reference could be a future, and a run-time check was needed on each dereference. In more recently proposed versions, futures are usually typed, and future creation and evaluation are explicit.

An alternative proposal for implementing futures in languages in which side effects are common specifies that futures should satisfy a strong futures linearizability constraint and does not consider type-specific optimizations. An existing system that employs call streams and promises operates to batch a collection of service calls (e.g., in a distributed system in which service calls are directed to remote machines) to reduce communication costs. In this existing system, executions of the batched calls are pipelined and their answers are obtained later. Another existing system employs dual data structures, which are objects whose methods are split into a request method that registers the invocation and returns a ticket, and a follow-up method that takes the ticket as an argument, and returns either the request's response or a "not ready" indicator (for example, if trying to dequeue from an empty queue). These dual data structures provide a new way to implement linearizable partial methods, and rely primarily on a polling mechanism to determine when an operation has been performed.

SUMMARY

The systems and methods described herein may in some embodiments exploit futures (and extensions thereto) to improve performance of long-lived concurrent data structures (e.g., long-lived objects that are shared by many threads and/or that may be located on a remote node). The system may support multiple "futures linearizability" policy options, each of which makes a different trade-off between determinism (which reduces the number of possible interleavings) and the flexibility to apply various optimization operations to pending operations, and each of which facilitates different (but possibly overlapping) ones of multiple optimization operations. Each of these futures linearizability policies may be non-blocking and compositional.

In some embodiments, a multithreaded application may include operations on a shared data structure, e.g., a stack, a queue instance, or a list-based set. For each of its operations that targets the shared data structure, a thread of the application may create a future (represented as a future object) and store it in a thread-local list of futures (under weak or medium futures linearizability policies) or in a shared queue of futures (under a strong futures linearizability policy). Each of the future objects may include an element specifying a respective operation to be performed, an element that stores a result of the respective operation, and an element indicating whether the result of the operation has been generated or has not yet been generated.

Prior to a thread evaluating a future, type-specific optimizations may be performed on the list or queue of pending futures. For example, futures may be sorted temporally or by key, in order to reduce the number of times that the list or queue of pending operations is traversed and/or the number of times that the shared data structure is accessed in order to apply the pending operations. In another example, multiple pending operations indicated in the futures may be combined (e.g., if they are of the same type or target the same element of the data structure) or eliminated (e.g., if they cancel each other out). During an evaluation of a future, a thread may compute the results of the operations indicated in one or more other futures.

In some embodiments, the order in which operations take effect and/or the optimization operations performed may be dependent on the futures linearizability policy. For example, under a weak futures linearizability policy, the order in which the operations take effect may be arbitrary as long as each operation takes effect between the time at which the corresponding future is created and the time at which it is evaluated (i.e., the time at which the results is obtained by the thread that invoked the operation). Under a strong futures linearizability policy, the order in which the operations take effect may be required to be the same as the order in which they were invoked. In some embodiments, under a medium futures linearizability policy, the order in which the operations invoked by a single thread take effect may be required to be in the same order in which they were invoked by that thread, but operations invoked by different threads may take effect in any order relative to each other.

Figure 1:
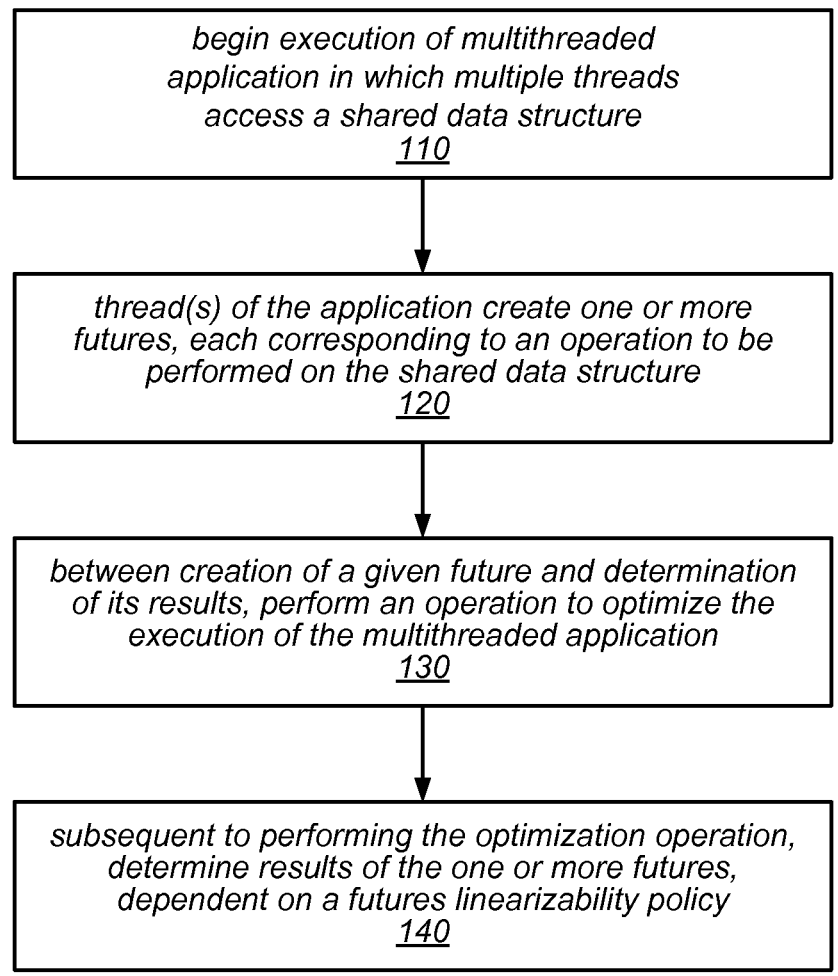
FIG. 1 is a flow diagram illustrating one embodiment of a method for creating and using futures (with side effects) when accessing shared data structures.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, use futures as a means of deploying highly-concurrent, type-specific techniques for improving the performance of scalable shared-memory data structures in large-scale multicore systems. As described herein, these systems may exploit futures to implement type-specific optimizations, using futures not just to manage parallel computations, but to improve performance of long-lived concurrent data structures (e.g., long-lived objects that are shared by many threads and that may be located on a remote node).

In many applications, when an operation is invoked (e.g., an operation that targets a shared data structure), the results of the operation may be needed right away. However, in other applications (e.g., applications in which there is likely to be contention or a long communication delay), it may not be possible (or even necessary) to immediately obtain the results. In some embodiments, using the techniques described herein, the evaluation of the operation may be postponed until the result is needed, which may reduce communication costs, and type-specific optimizations may be performed on the operation (and/or on other pending operations) in the meantime, in order to improve the overall performance of the application. For example, optimizations that are applied between the time at which a given operation is invoked and the time at which its results are needed may cause the results of the given operation to be computed and/or may cause the results of other pending operations to be computed so that they are ready when needed. In some embodiments that employ the techniques described herein, operations may be invoked by various threads of a multi-threaded application long before their results are needed.

One example in which the techniques described herein may be used to improve the performance of an application in which multiple threads access a shared data structure is a producer/consumer application, in which threads can produce and consume elements out of a shared pool of elements. In this example, a given thread can produce multiple elements. However, instead of competing with other threads on the pool to store those elements, the application may use futures and store those elements in one or more thread-local buffers. Subsequently, when the same thread wants to consume an element, instead of going to the shared pool and competing with one or more other threads to obtain an element, it may consume an element out of its thread-local buffer(s).

The use of futures described herein departs in important ways from the original proposal, in which futures were benign annotations that did not affect a program's meaning, and in which the computations associated with the futures had no side effects. By contrast, the use of futures described herein employs operations that exist for their side effects on shared, long-lived state (i.e., operations that can interact and interfere with one another). For example, these side effects may include changes to a shared data structure targeted by the operations of pending futures, such as removing or adding one or more elements to the shared data structure. In other words, the futures of the original proposal have been redefined and extended to provide benefits to long-lived concurrent data structures.

As described in more detail herein, instead of simply allowing requests that target a shared data structure to be performed (or remain pending) in parallel with computations that perform other work (i.e., work that is not related to operations pending on the shared data structure), the techniques described herein may allow optimizations on the pending operations themselves to be performed while waiting for the results (e.g., combining multiple different requests, allowing multiple different requests cancel each other out, allowing one thread to evaluate multiple different requests on behalf of multiple other threads, or allowing a thread to obtain its result locally, without having to go to a central shared data structure). In other words, subsequent to creating a future, but prior to evaluating it, type-specific optimizations such as these may improve performance and reduce contention on the shared data structure targeted by the pending future. In some embodiments, the use of futures along with type-specific optimizations, such as combining and elimination, may improve cache locality and/or reduce contention for multithreaded applications.

As described in more detail below, in order to exploit these benefits in an effective way, clear notions of correctness must be defined, as no single notion of correctness is likely to cover all reasonable cases. New extensions to linearizability have been defined that are appropriate for method calls that return futures as results. These three new extensions, or "futures linearizability" policy options, may be referred to as strong, medium, and weak futures linearizability. In various embodiments, each of these policy options makes a different trade-off between determinism (which may reduce the number of possible interleavings) and the flexibility to apply various optimizations (which may yield more efficient programs), and each of them facilitates different (but possibly overlapping) ones of multiple optimization operations. Like standard linearizability, however, these notions require that any concurrent execution be equivalent, in some sense, to a sequential computation.

To illustrate the utility of these extensions and tradeoffs made by these extensions, in various embodiments, implementations of three common data structures (stacks, queues, and list-based sets) have been designed to exploit futures, and their performance on a multicore system has been compared to that of existing lock-free alternatives. These experiments were used to quantify the trade-offs between performance and determinism using different futures linearizability policy options. For example, in systems in which it is acceptable to have some amount of uncertainty in how operations are interleaved with each other, there may be greater opportunity for optimization. However, in systems in which this behavior is more tightly constrained, there may not be as much freedom to apply optimizations. Experimental results have shown that optimizations enabled by the use of these extended futures may lead to substantial performance improvements. In particular, implementations satisfying the weak and medium correctness conditions typically significantly outperform existing lock-free alternatives, in some cases by up to two orders of magnitude. In addition, even though the implementations satisfying the strong correctness condition typically perform worse than other future-based versions, there exist cases in which they achieve better performance than the lock-free alternatives.

As noted above, the techniques described herein may, in various embodiments, be employed in the design and implementation of long-lived objects shared by many threads. Calling an operation of such an object can sometimes take a long time, e.g., when there is contention or when the object resides on a remote node in a non-uniform memory access (NUMA) architecture. In some embodiments, to alleviate these problems, the operations of the object may return futures as return values. By using futures, threads may be able to accumulate multiple pending operations, i.e., operations that were invoked, but not yet applied to the object. This may allow flexibility in the evaluation of those operations. As previously noted, the use of these futures may enable type-specific optimizations (such as combining and elimination) that reduce contention, improve cache locality and/or reduce communication costs for multithreaded applications that utilize shared data structures in large-scale multicore systems.

In the embodiments described herein there may exist a separation between how operations are ordered (e.g., whether they are evaluated in the same order in which they were created or in a different order) and how they are evaluated (e.g., when and how their results are eventually computed and made available to the threads that invoked them). For example, in some embodiments, the threads of a multithreaded application may create one or more futures (each corresponding to an operation on a shared data structure), and may store the futures in a list of pending futures. Between creation of a given one of these futures and its evaluation, one or more optimization operations may be performed on the list of pending futures. Subsequently, the given future and one or more other futures may be evaluated. In such embodiments, the order in which the futures are evaluated and/or the particular optimization operations that are performed on the list of pending futures may be dependent, at least in part, on the types of the pending operations that target the shared data structure and the particular futures linearizability policy option that is employed in the system.

Futures and Long-Lived Objects

As noted above, a future is a data object that represents a promise to deliver the result of an asynchronous computation when it is ready. The sample code fragment below uses a future, according to its originally proposed definition. For example, in line 1, a thread creates a future to hold the result of an asynchronous computation, in line 2, the thread does some unrelated work, and in line 3, the thread calls the future's evaluation method to retrieve the result of the task, blocking if necessary until that result is ready. Note that calling the evaluation method of a future may sometimes be referred to as evaluating or touching that future.

Future<T> f=submit(task); //start task
    . . . //do something else
    T x=f.eval ( ); //pick up task's result While futures were originally proposed as a way of managing short-lived functional computations, the extensions and techniques described herein are focused on their use with long-lived mutable objects, such as lists, queues, or stacks that are shared by multiple threads in a multicore architecture. In some embodiments, these objects may return future values in response to method calls. These method calls may have side effects, and the results may return information about the object state (such as the result of a map look-up) or confirmation that a side effect has taken place (such as confirming that map has finished binding a key to a value). In some embodiments, the systems described herein may include a futures support module or a futures support library that includes methods for instantiating and then operating on these data structures using future objects. Such a support module may include multiple different versions of these methods, each corresponding a different futures linearizability policy or may include parameterized methods that allow for static or dynamic selection of one of multiple supported futures linearizability policies, in different embodiments. In other embodiments, these shared data structures may be implemented as objects for which such methods are defined.

As described in more detail below, it has been found that in some embodiments, futures, when properly redefined, may provide substantial benefits to long-lived concurrent data structures, such as the following:

Combining: Multiple requests may be combined into a single request, reducing computation and communication latency.

Elimination: Some requests may cancel each other out, eliminating the need to access the shared object at all (i.e., eliding operations that would have no cumulative effect).

Contention reduction and cache efficiency: Combining and elimination may cause the shared data structure to be accessed less frequently, alleviating synchronization bottlenecks and incurring less cache coherence traffic.

Parallelism: One thread may be able to apply pending operations on behalf of others. This thread may be selected dynamically (as described herein) or it may be designated statically, in different embodiments.

Scheduling: The implementation may be free to choose whether to apply pending method calls eagerly or lazily.

As noted above, in order to apply these optimizations correctly, there must be some definition what it means when a method call to a mutable object returns a future, and how a result retrieved from the evaluated future is related to the state of that mutable object.

Futures and Linearizability

As previously noted, a future's value is calculated sometime between when that future is created and when it is evaluated. As originally conceived, future computations were short-lived tasks without side effects, so it was impossible to observe when these computations actually happened. In the embodiments described herein, by contrast, futures may be returned by methods that have side effects on shared data structures, such as adding an item to or removing an item from a container, enqueuing or dequeuing elements of a queue, or pushing or popping elements of a stack. Therefore, it is important to define when a future-returning method can take effect, and, indirectly, how such effects might be interleaved.

In the absence of futures, it is common to define the behavior of concurrent method calls through properties such as linearizability. Each object may be assumed to provide a sequential specification, which describes its behavior in sequential executions where method calls do not overlap. To describe an object's concurrent behavior, each method call may be split into two instantaneous events: the invocation, which is when control leaves the caller, and the response, which is when control (and perhaps a result) returns to the caller. Informally, an execution is linearizable if each method call appears to take effect instantaneously between its invocation and its response events. To make effective use of futures, and to determine which optimizations are permitted, various extensions to linearizability have been defined, corresponding to multiple futures linearizability policies.

One embodiment of a method for creating and using futures (with side effects) when accessing shared data structures is illustrated by the flow diagram in FIG. 1. As illustrated at 110, in this example, the method may include beginning execution of a multithreaded application (or a computation thereof) in which multiple threads access a shared data structure. The method may include one or more threads of the application creating one or more futures, each of which is represented by a respective data object (sometimes referred to herein as a "future object"), and each of which may correspond to an operation to be performed on the shared data structure, as in 120. For example, one thread may create multiple futures representing different operations to be applied to the shared data structure, or multiple threads may each create one or more futures, each representing an operation to be applied to the shared data structure.

As illustrated in this example, between the time at which a given one of the futures is created and the time at which its result is determined (which may be when it is evaluated or prior to its evaluation), the method may include performing an operation to optimize the execution of the multithreaded application (or computation thereof), if and when such optimizations are applicable, as in 130. For example, one or more optimization operations may be performed (e.g., by a method of a futures support module/library) to improve the overall performance of the multithreaded application (or computation thereof) using any of a variety of techniques (including, but not limited to, those described herein). Subsequent to performing the optimization operation, the method may include determining the results of the one or more futures, dependent on an applicable futures linearizability policy, as in 140. For example, the results of each of the futures (e.g., the results of their respective operations on the shared data structure) may be computed by a method of a futures support module/library, and the order in which the results are determined and/or the particular optimization operations that are performed may be dependent, at least in part, on a particular futures linearizability policy. The particular futures linearizability policy that is applied may be selected from among several supported futures linearizability policies, or may be the only (or default) policy implemented by the system, in different embodiments.

As noted above, there may be several natural ways to extend linearizability to futures, and each may have its own advantages and disadvantages. In various embodiments, the systems described herein may make different trade-offs between performance and optimization opportunities and the amount of interleavings and determinism that can be achieved under different ones of these futures correctness conditions. Three such futures linearizability policies are described informally first, and more formally later. These choices between these three futures linearizability policies may be illustrated using the pseudocode fragment shown below. This pseudocode fragment illustrates the use of futures for various operations on a FIFO queue.

```
Future<Nil> fx=queue.enq(x);
Future<Nil> fy=queue.enq(y);
Future<T> fz=queue.deq( );
fx. eval ( ); //force enq(x) to happen?
fy. eval ( ); //force enq(y) to happen?
T z=fz. eval ( ); //value at head of queue?
```

In this example, the FIFO queue is initially empty, and provides enq( ) and deq( ) methods that return futures. In this example, the thread first calls enq(x), returning future fx, then enq(y), returning future fy, and finally deq( ), returning future fz. The thread then evaluates first fx, then fy, and finally fz. There are several reasonable assumptions that could be made about the value returned from fz, depending on the futures linearizability policy that is applied. Some of these assumptions are described below, according to different embodiments.

In some embodiments, a natural correctness condition (which may be referred to as the strong futures linearizability policy, or as the "strong-FL" policy) may be employed that requires each method call to take effect at some instant between its call (creating the future), and its response (returning the future), just as if it were a regular method call. In the example pseudocode above, enq(x) precedes enq(y), which precedes deq( ). Therefore, under this strong futures linearizability policy (and assuming that no other thread is accessing the queue), evaluating fz would yield a result value of x. This strong futures linearizability policy is similar to the standard definition of linearizability, in that futures are treated as benign hints for optimizations, and in that implementations are free to delay the actual computation until the future is evaluated, as long as no thread can tell the difference. In some embodiments, this separation of how operations are ordered from when they are evaluated can be very beneficial in some cases. For many applications, however, strong futures linearizability may rule out certain attractive optimizations.

In other embodiments, another natural correctness condition (which may be referred to as the weak futures linearizability policy, or as the "weak-FL" policy) may be employed that requires each method call take effect at some instant between its call (creating the future), and that future's evaluation, but that allows pending futures to be evaluated (or their results computed) in any order. Under this weak futures linearizability policy, the calls to enq(x), enq(y), and deq( ) in the example pseudocode above may be free to take effect in any order. Therefore, evaluating fz could yield either Nil (if deq( ) takes effect first), x (if enq(x) takes effect first), or y (if enq(y) takes effect first). This futures linearizability policy choice may give the run-time system considerable freedom for optimization. For some applications, however, this condition may be too permissive. Under this futures linearizability policy, a thread that wants to enqueue x before y would have to evaluate fx before calling enq(y), making optimizations such as combining impossible.

In some embodiments, an intermediate policy (which may be referred to as the medium futures linearizability policy, or as the "medium-FL" policy) may be employed that balances the programmer's guarantees with the flexibility for optimization. Under this medium futures linearizability policy, the following two issues may be considered separately: (1) when a future's computation takes effect, and (2) how a future's computation is ordered with respect to the computations of other futures. For question (1), each method call may be required to take effect at some instant between that method's future's creation and its evaluation, just as in weak futures linearizability. For question (2), two future method calls issued by the same thread to the same object may be required to take effect in the same order as their future creation operations. In the example pseudocode above, enq(x) precedes enq(y), which precedes deq( ). Therefore, under this medium futures linearizability policy, evaluating fz must yield x.

As noted in the formal definitions given later, in some embodiments, the following two corollaries may be true for the futures linearizability policies described herein:

Corollary 1: Strong, medium, and weak futures linearizability are all non-blocking Corollary 2: Strong, medium, and weak futures linearizability are all compositional.

Intuitively, the first corollary implies that for any of these linearizability extensions, when used by itself, the futures linearizability policy never forces a thread T with a pending operation op to wait for another pending operation to complete before T can evaluate the future corresponding to op. The second corollary implies that for any one of these linearizability extensions, a combination of two or more objects, each individually satisfying that extension, collectively satisfies that extension. For example, if a system includes two separate data structure implementations (e.g., a stack and a queue, or two queues), each of which independently satisfies the same one of these linearizability extensions, then their composition also satisfies that linearizability extension. In this example, if items are pulled off of one of the data structures and pushed onto the other (and vice versa), the way that the operations behave (collectively) and the order in which they are collectively evaluated (with respect to the combination of the two data structures) will be consistent with that linearizability extension. Note that the properties defined by corollaries above hold for the standard linearizability definition. In contrast, however, serializability is not non-blocking, and sequential consistency is not compositional.

Exploiting Futures

In some embodiments, futures may provide a systematic and clean way to encapsulate a variety of optimization techniques, including elimination (in which operations cancel one another without synchronizing at a shared object that is the target of the operations), combining (in which multiple operations are combined into a single operation that is applied to the shared object) and flat combining (in which a single thread executes method calls on behalf of multiple concurrent threads). As described below, futures may be exploited to encapsulate type-specific optimizations for a variety of data types, including, but not limited to, queues, stacks, and linked lists (or list-based sets). For brevity, in the descriptions that follow, it may be assumed that if an object exports any operations that return futures, then all of its operations do so.

In the examples described herein threads may share an instance of a particular data structure (e.g., a queue, stack, or list-based set, respectively). In weak-FL and medium-FL implementations, this shared instance may be similar to an existing lock-free version of the data structure, except that it supports single-operation insertion or removal of multiple nodes. For instance, pushing multiple nodes (organized in a list) into a stack may be considered an extension of the single-node code, where the last node of the list is connected to the first node in the stack and the head of stack is updated using a single compare-and-swap (CAS) type instruction to point to the first node in the list. The strong-FL implementation may employ a sequential instance of the data structure, for reasons discussed below.

In some embodiments, including in the prototype implementations used in the evaluations described below, futures may be realized as data objects (sometimes referred to as "future objects"), each of which includes respective fields for an identifier of the operation to be performed (e.g., an opCode), an input value (e.g., an argument of the operation), a result value, and an indication of whether or not the result is available for retrieval (e.g., a resultReady indicator). In such embodiments, the evaluation of a future may be completed by writing the corresponding result into the result field of the corresponding future object and setting its resultReady flag. In such embodiments, a thread may quickly determine whether an operation is still pending by reading the resultReady flag of the corresponding future object.

Note that an operation (or a future) may be referred to as pending if its invocation has occurred, but the operation itself has not yet been applied to its object. For the weak and medium-FL implementations, each thread may have up to two thread-local lists to store and evaluate its own pending operations (which may be represented in the list as future objects). Each such list may present an opportunity to apply type-specific optimizations (such as combining or canceling compatible operations), as described herein. More details on how these local lists are managed are described below, according to various embodiments.

Figure 2:
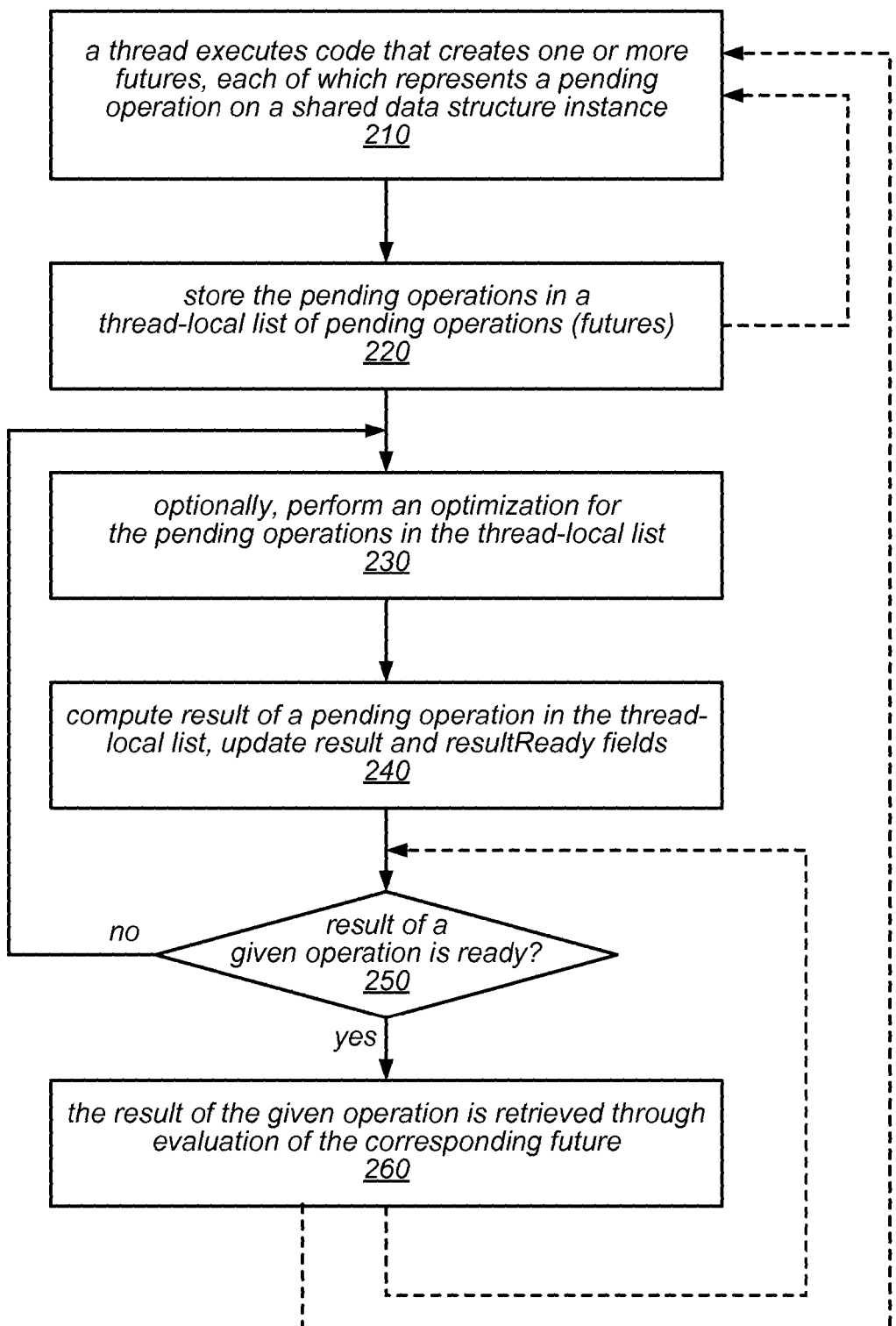
FIG. 2 is a flow diagram illustrating one embodiment of a method for creating and evaluating a future under a weak or medium futures linearizability policy.

One embodiment of a method for creating and evaluating a future under a weak or medium futures linearizability policy is illustrated by the flow diagram in FIG. 2. As illustrated at 210, in this example, the method may include a thread (e.g., a thread of a multithreaded application) executing code that creates one or more futures, each of which represents a pending operation on a shared data structure instance. As noted above, in some embodiments, each of these futures may be implemented as a respective data object that includes fields for an identifier of the operation to be performed (e.g., an opCode), an input value (e.g., an argument of the operation), a result value, and/or an indication of whether or not the result is available for retrieval (e.g., a resultReady indicator). The method may also include storing the pending operations in a thread-local list of pending operations (which are represented in the list as future objects), as in 220.

As illustrated in this example, the method may include, optionally, performing an optimization for the pending operations in the thread-local list, if and when such optimizations are applicable, as in 230. At some point (subsequent to the futures being created and added to the thread-local list and/or performing an optimization operation), the method may include initiating the evaluation of a given future (a given operation corresponding to a particular future). This may include computing a result of a pending operation in the thread-local list (e.g., by the same thread or different thread), and updating the result and resultReady fields of the corresponding future object, as in 240. Subsequently, if the result of the given operation (the given operation corresponding to the particular future whose evaluation was initiated) is not ready, shown as the negative exit from 250, the method may include repeating the operations shown as 230-250 until the result of the given operation is ready. This is illustrated in FIG. 2 by the feedback from the negative exit of 250 to 230.

As illustrated in FIG. 2, if (or once) the result of the given operation is ready, shown as the positive exit from 250, the result of the given operation may be retrieved, as in 260. For example, the result may be read from the result field of the future object corresponding to the given operation by the thread that initiated the evaluation of the particular future or by the caller of an operation that triggered the creation and/or evaluation of the particular future (e.g., if the caller was a different thread). Note that, as shown by the dashed lines from 220 to 210 and from 260 to 210, the thread may create/invoke any number of futures before any of them are evaluated (and/or before their results are computed) or any optimizations on pending operations corresponding to those futures are performed, and may continue to create futures (whose pending operations may be stored in a thread-local list of pending operations) while optimizations are performed and/or other futures are evaluated (and/or their results are computed). Similarly, as shown by the dashed line from 260 to 250, various threads (e.g., threads that created/invoked and/or called for the evaluation of other futures) may attempt to retrieve the results of other pending operations when and if they become available. Also note that, in at least some embodiments, each thread of a multithreaded application (or a computation thereof) that accesses the shared data structure instance may perform at least a portion of the process illustrated in FIG. 2.

For the strong-FL implementations, each operation appears to take effect before its future is returned. In some embodiments, in order to achieve this, all threads may share a single queue of pending operations that are to be performed on a shared data structure instance, and the shared queue implementation may allow the threads to add new operations (or more precisely, future objects, each of which indicates an operation to be performed on the shared data structure instance) in a lock-free manner. In such embodiments, when a thread invokes an operation, it allocates and enqueues a future object describing that operation, and returns the future to the caller. In some embodiments, the evaluation of pending operations may be protected by a lock. In such embodiments, when a thread T evaluates a future F, it tries to acquire the lock. If it succeeds, and if F is still pending, T may record the last pending operation that is currently found in the queue of pending operations. Note that if T fails to acquire the lock, it may wait until the lock becomes available again, checking periodically that F is still pending. Once T acquires the lock, T may evaluate all operations in the queue, including F, starting from the head (or, more precisely, from the operation next to the head, in embodiments in which the first operation is a dummy operation) and up to the previously recorded last operation.

In some embodiments, while T is holding the lock, other threads may be able to keep adding new operations to the shared queue of pending operations, which may or may not be evaluated by T. Note, however, that the number of pending operations evaluated by T (and thus the amount of time that T possesses the lock) may be limited. While evaluating pending operations, T may be free to apply type-specific optimizations to the pending operations on the shared queue of pending operations, e.g., combining multiple operations or eliminating one or more operations. In some embodiments, once T has exclusive access to the shared data structure instance, the (possibly combined) operations may be applied directly to the shared data structure instance, avoiding the need for fine-grained synchronization. When T is finished applying pending operations, it may update the head of the queue of pending operations to point the recorded last operation, effectively removing the evaluated operations from the queue, and then may release the lock.

Figure 3:
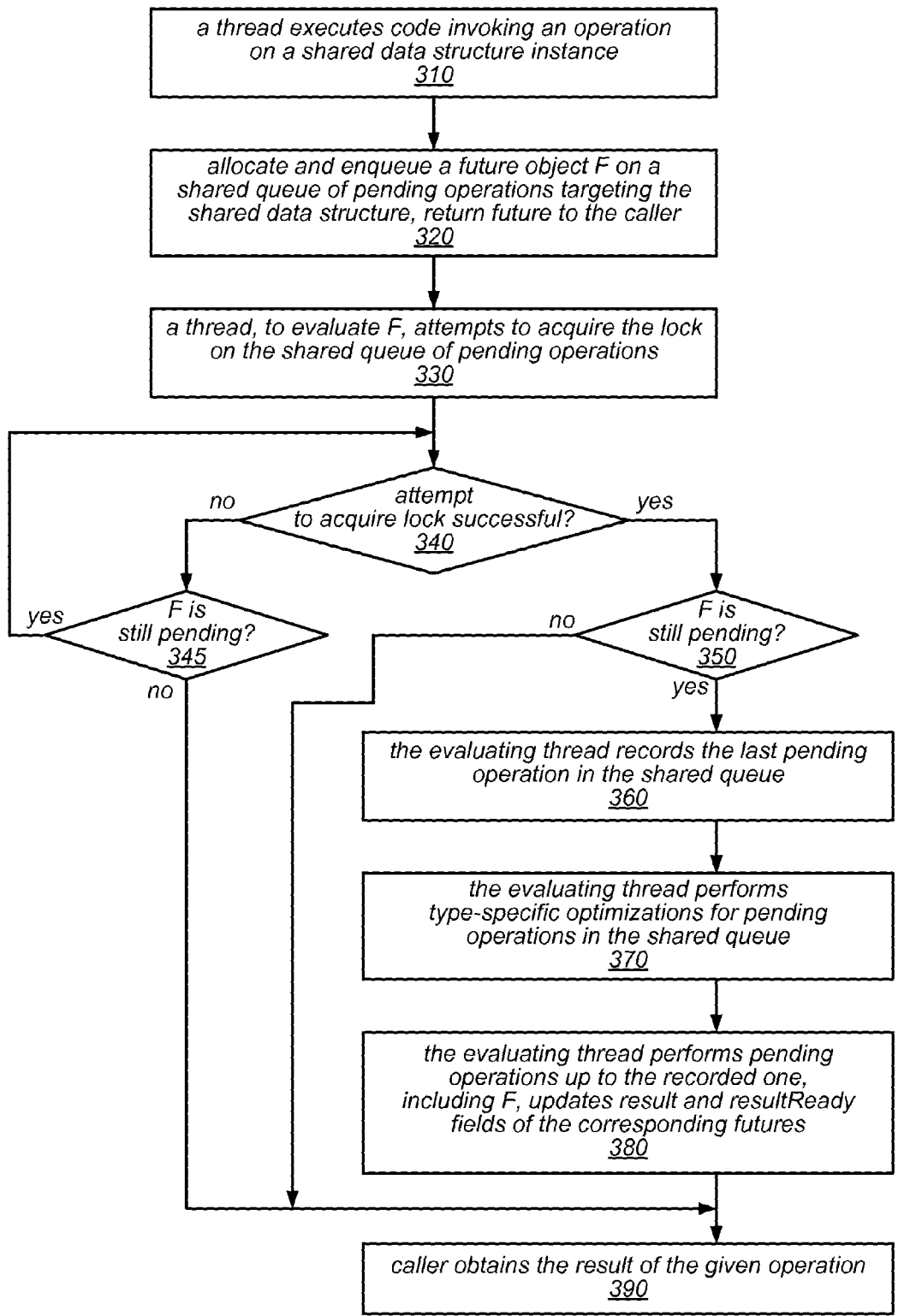
FIG. 3 is a flow diagram illustrating one embodiment of a method for creating and evaluating a future under a strong futures linearizability policy.

One embodiment of a method for creating and evaluating a future under a strong futures linearizability policy is illustrated by the flow diagram in FIG. 3. As illustrated at 310, in this example, the method may include a thread (e.g., a thread of a multithreaded application) executing code that invokes an operation on a shared data structure instance (e.g., code that creates a future F associated with the operation on the shared data structure instance). The method may include allocating and enqueuing a future object for F on a shared queue of pending operations targeting the shared data structure (e.g., a queue of pending operations that is accessible by multiple threads or processes, each pending operation being represented in the queue by a respective future object), and returning the future to the caller (i.e., to the thread that invoked the operation on the shared data structure instance), as in 320.

As illustrated in this example, at some point (subsequent to the future being created) in order to evaluate F, the method may include a thread attempting to acquire the lock on the shared queue of pending operations, as in 330. If the attempt to acquire the lock not successful (shown as the negative exit from 340) and if F is still pending (shown as the positive exit from 345), the method may include waiting to acquire the lock before proceeding. This is illustrated in FIG. 3 by the feedback from the positive exit of 345 to 340. If the attempt to acquire the lock is not successful (shown as the negative exit from 340) but F is no longer pending (shown as the negative exit from 345), the method may include the caller obtaining the result of the given operation, as in 390. For example, the future F may have been evaluated by another thread as part of an operation to evaluate another future in the shared queue.

On the other hand, if (or once) the attempt to acquire the lock is successful (shown as the positive exit from 340), and if F is still pending (shown as the positive exit from 350), the method may include the evaluating thread recording the last pending operation in the shared queue, as in 360. The method may also include the evaluating thread performing one or more type-specific optimizations for the pending operations that are represented by future objects in the shared queue (if and when such optimizations are applicable), as in 370. The method may include the evaluating thread evaluating one or more pending operations up to the previously recorded one (including the pending operation represented by future F), and updating the result and resultReady fields of the corresponding futures, as in 380, after which the caller may obtain the result of the given operation, as in 390. Otherwise, if (or once) the attempt to acquire the lock is successful (shown as the positive exit from 340), if F is no longer pending (shown as the negative exit from 350), the method may include the caller obtaining the result of the given operation, as in 390. For example, the future F may have been evaluated by another thread as part of an operation to evaluate another future in the shared queue.

While there may be many ways to implement the example shared objects (data structure instances) while satisfying the correctness conditions presented above, the particular implementations described herein were chosen for simplicity. For example, the strong-FL implementations may have limited scalability, because the shared queue of pending operations or the lock protecting evaluations may become bottlenecks under high contention. Such limitations may matter more for objects whose operations are lightweight, such as queues and stacks. In particular, better performance might be achieved by applying the elimination optimization in the strong-FL stack before resorting to the shared queue of pending operations. While the example approaches for exploiting futures presented herein may not necessarily be optimal, they may be general enough to be applied to different data structures with minimal effort. As described in more detail later, by enabling a clean separation between how operations are ordered and how they are evaluated, this approach may be most beneficial for use with objects whose operations are heavyweight, such as long linked lists (or other list-based sets).

Figure 4A:
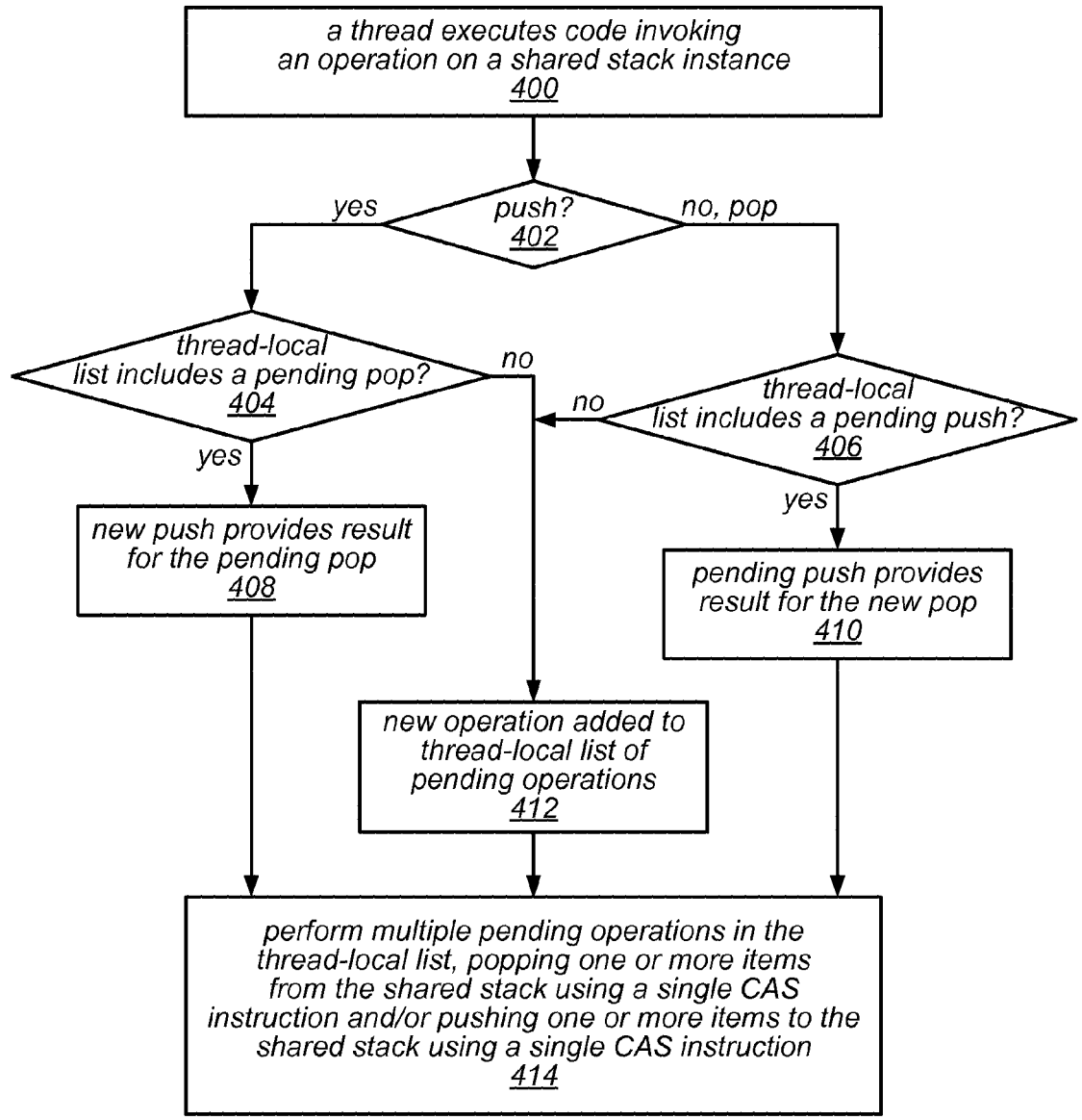
FIGS. 4A-4C are flow diagrams illustrating various embodiments of methods for creating and evaluating futures for applications (or computations thereof) that access a shared stack, according to different futures linearizability policies.
Figure 4B:
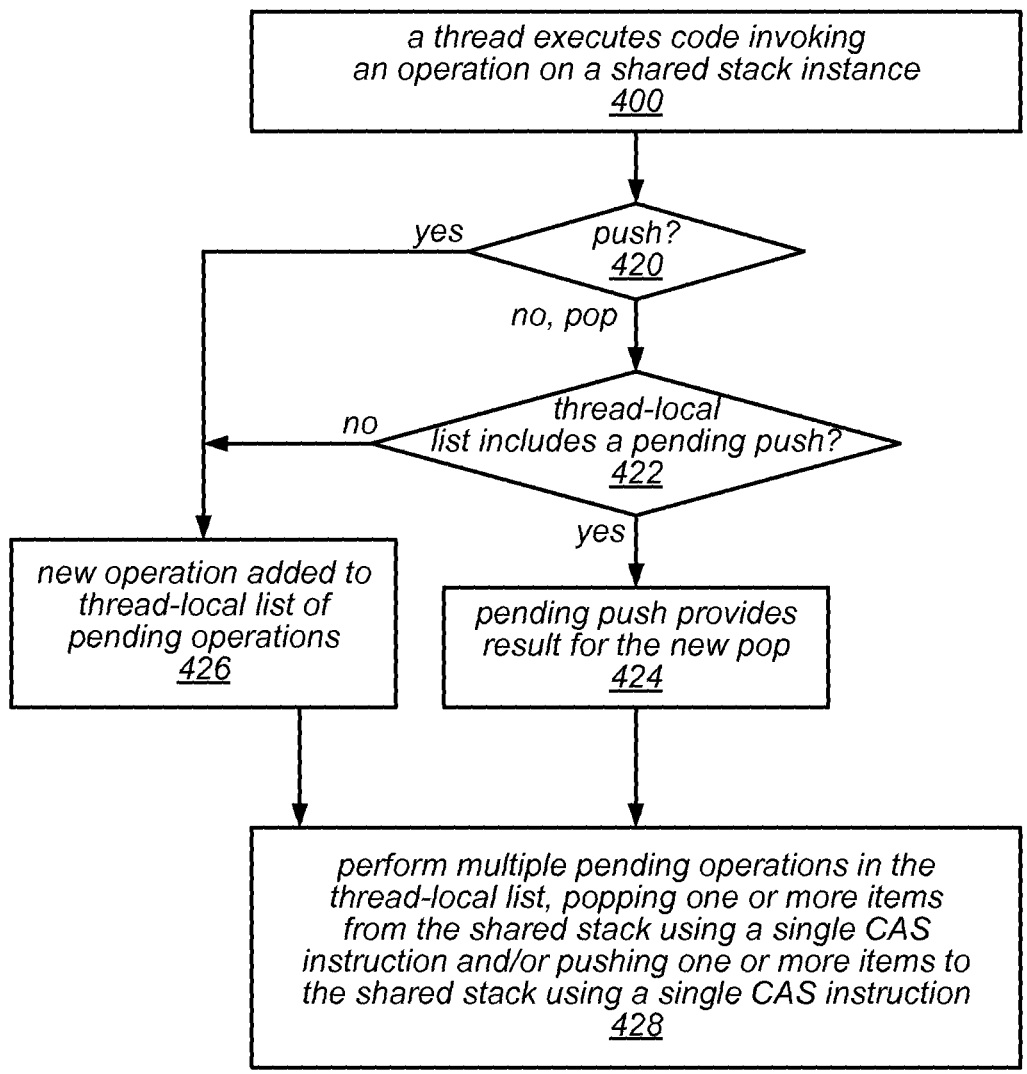
Figure 4C:
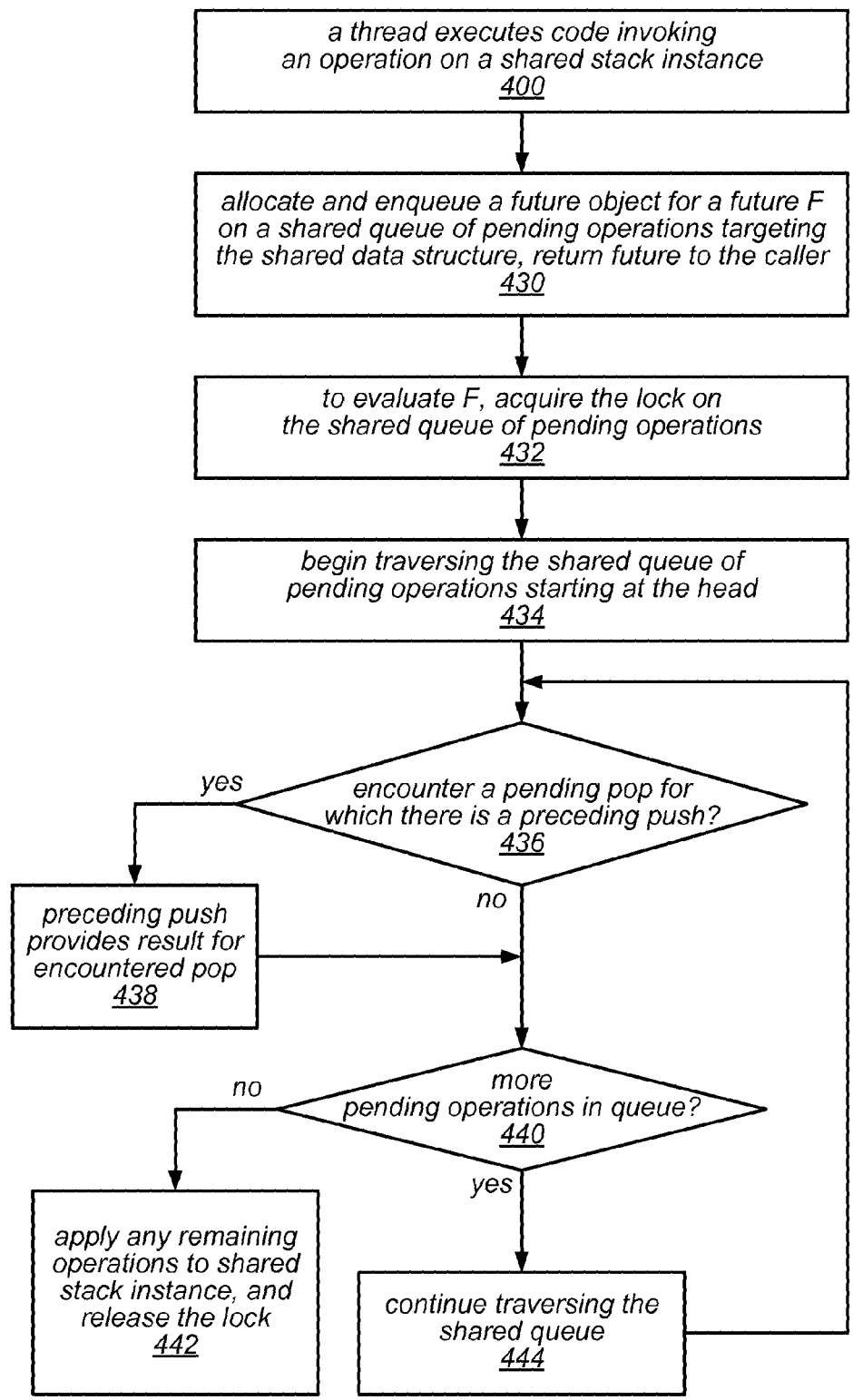

FIGS. 4A-4C are flow diagrams illustrating various embodiments of methods for creating and evaluating futures for applications (or computations thereof) that access a shared stack, according to different futures linearizability policies. In these examples, the particular optimizations performed on the pending operations and/or the order in which pending operations are evaluated (or their results are computed) may be dependent on the particular futures linearizability policy that is applied.

Under the weak-FL policy, which permits each operation to take effect at any instant between its invocation and its future's evaluation, pending push( ) and pop( ) operations that target a shared stack may be reordered, increasing the potential for the elimination optimization. As a result, each thread's local list may contain operations of a single type only. Specifically, in some embodiments, when a thread invokes a push( ), it may determine whether its local list contains any pending pop( ) operations. If so, the push( ) may provide a result to one of the pending pop( ) operations. In other words, the value of the future for the push( ) operation may be copied into the result field of the future for the pop( ) operation, and the resultReady flag may be set for both futures. Otherwise, the new push( ) may be added to the list of pending push( ) operations. The code for pop( ) operations may be symmetric, with a pending push( ) operation providing a result for a new pop( ) operation.

In some embodiments, under this weak-FL policy, when a thread evaluates a future, it may actually evaluate all of the futures stored in that thread's local list. This may allow the thread to combine multiple operations and, thus, reduce the number of accesses to the shared stack instance. For example, for pop( ) operations, the number of items corresponding to the number of pending pop( ) invocations may be popped from the shared stack using a single CAS type instruction. If the stack does not contain enough items for the number of pop( ) operations, all items may be removed from the stack and each of the excess pop( ) operations may be paired with a special "empty stack" value. Symmetrically, the items associated with all pending push( ) operations may be pushed onto the stack using a single CAS type instruction.

One embodiment of a method for creating and evaluating futures under a weak futures linearizability policy for applications (or computations thereof) that access a shared stack is illustrated by the flow diagram in FIG. 4A. As illustrated at 400, in this example, the method may include a thread (e.g., a thread of a multithreaded application) executing code that invokes an operation on a shared stack instance. If the operation is a push operation (shown as the positive exit from 402) and if a thread-local list of pending operations (e.g., operations indicated in pending futures, each of which is represented by a respective future object) includes a pending pop operation (shown as the positive exit from 404), the method may include the new push operation providing a result for the pending pop operation (in which case new push operation will not be added to the thread-local list of pending operations and the pending pop operation is removed from the thread-local list of pending operations), as in 408. As illustrated in this example, if the operation is a push operation (shown as the positive exit from 402), but the thread-local list of pending operations (which are represented in the list by corresponding future objects) does not include a pending pop operation (shown as the negative exit from 404), the method may include adding the new operation (in this case, a new push operation) to the thread-local list of pending operations (future objects), as in 412.

If the operation is not a push operation (e.g., if it is a pop operation, shown as the negative exit from 402), and the thread-local list of pending operations (which are represented in the list by corresponding future objects) includes a pending push operation (shown as the positive exit from 406), the method may include the pending push operation providing a result for the new pop operation (in which case new pop operation will not be added to the thread-local list of pending operations and the pending push operation is removed from the thread-local list of pending operations), as in 410. Otherwise, if the operation is not a push operation (e.g., if it is a pop operation, shown as the negative exit from 402), but the thread-local list of pending operations (which are represented in the list by corresponding future objects) does not include a pending push operation (shown as the negative exit from 406), the method may include adding the new operation (in this case, a new pop operation) to the thread-local list of pending operations (which are represented in the list by corresponding future objects), as in 412.

As illustrated in this example, at some point later (e.g., after the new operation has been handled as described above), the method may include a thread (e.g., the same thread that invoked the new operation or a different thread) evaluating multiple pending operations (future objects) in the thread-local list, popping one or more items from the shared stack using a single CAS type instruction and/or pushing one or more items to the shared stack using a single CAS type instruction, as in 414. In various embodiments, this evaluation operation may include computing the combined results for all of the pending operations on the shared stack instance that are represented in the thread-local list, for all of the operations in the thread-local list that were pending when the evaluation began, or for another subset of the pending operations in the thread-local list. Note that, in at least some embodiments, at least a portion of the method illustrated in FIG. 4A may be performed for the pending operations invoked by each thread of a multithreaded application (or a computation thereof) that accesses the shared stack instance.

Note that, in various embodiments, a method of a futures support module or futures support library may (e.g., in response to the creation of a new future) perform adding a future (or an operation thereof) to a thread-local list of pending futures or operations to be performed on a shared data structure (e.g., the shared stack described above), or may (e.g., prior to or as part of performing an evaluation of a future) perform an optimization operation on the thread-local list of pending futures or operations (e.g., cancelling complementary pop/push operations, or combining multiple pop operations or multiple push operations) and/or compute the result of a future (e.g., individually or in combination with the results of one or more other futures). In other embodiments, the shared stack may be implemented as an object for which such methods are defined.

Under the medium-FL policy, a shared stack implementation cannot cancel complementary operations quite as aggressively as under the weak-FL policy since it is required to respect the ordering of a thread's operations. As a result, the local list may contain pending operations of distinct types. In other words, the medium-FL property implies that a push( ) operation cannot be combined with a prior pending pop( ) operation, but a pop( ) operation can be combined with the most recent prior push( ). In some embodiments, multiple pending operations of the same type may be combined when modifying the shared stack, allowing a thread to add or remove multiple items with a single CAS type instruction, as in the example above.

One embodiment of a method for creating and evaluating futures under a medium futures linearizability policy for applications (or computations thereof) that access a shared stack is illustrated by the flow diagram in FIG. 4B. As illustrated at 400, in this example, the method may include a thread (e.g., a thread of a multithreaded application) executing code that invokes an operation on a shared stack instance. If the operation is a push operation (shown as the positive exit from 420) the method may include adding the new operation (in this case, a new push operation) to a thread-local list of pending operations (e.g., operations indicated in pending futures, each of which is represented by a respective future object), as in 426.

If the operation is not a push operation (e.g., if it is a pop operation, shown as the negative exit from 420), and if the thread-local list of pending operations (e.g., operations indicated in pending futures, each of which is represented by a respective future object) includes a pending push operation (shown as the positive exit from 422), the method may include the pending push operation providing a result for the new pop operation (in which case new pop operation will not be added to the thread-local list of pending operations and the future including the pending push operation is removed from the thread-local list of pending operations), as in 424. Otherwise, if the operation is not a push operation (e.g., if it is a pop operation, shown as the negative exit from 420), but the thread-local list of pending operations (which are represented in the list by corresponding future objects) does not include a pending push operation (shown as the negative exit from 422), the method may include adding the new operation (in this case, a new pop operation) to the thread-local list of pending operations (which are represented in the list by corresponding future objects), as in 426.

As illustrated in FIG. 4B, at some point later (e.g., after the new operation has been handled as described above), the method may include a thread (e.g., the same thread that invoked the new operation or a different thread) evaluating multiple pending operations (future objects) in the thread-local list, popping one or more items from the shared stack using a single CAS type instruction and/or pushing one or more items to the shared stack using a single CAS type instruction, as in 428. As in the previous example, this evaluation operation may, in various embodiments, include computing the combined results for all of the pending operations on the shared stack instance that are represented in the thread-local list, for all of the operations in the thread-local list that were pending when the evaluation began, or for another subset of the pending operations in the thread-local list. Note that, in at least some embodiments, at least a portion of the method illustrated in FIG. 4B may be performed for the pending operations invoked by each thread of a multithreaded application (or a computation thereof) that accesses the shared stack instance.

Again note that, in some embodiments, a method of a futures support module or futures support library may (e.g., in response to the creation of a new future) perform adding a future (or an operation thereof) to a thread-local list of pending futures or operations to be performed on a shared data structure (e.g., the shared stack described above), or may (e.g., prior to or as part of performing an evaluation of a future) perform an optimization operation on the thread-local list of pending futures or operations (e.g., cancelling complementary pop/push operations in certain cases, or combining multiple pop operations or multiple push operations) and/or compute the result of a future (e.g., individually or in combination with the results of one or more other futures). In other embodiments, the shared stack may be implemented as an object for which such methods are defined.

For a shared stack implemented under the strong-FL policy, when a thread attempts to evaluate a future that targets the shared stack, it may first attempt to acquire a lock that is associated with a shared queue of pending operations that target the shared stack. If the attempt succeeds, the thread may traverse that shared queue of pending operations starting from its head. When possible, the thread may eliminate pending pop( ) operations using the values associated with preceding pending push( ) operations as the results of the pending pop( ) operations. When the thread reaches the end of the shared queue of pending operations, it may apply any remaining pop( ) and/or push( ) operations (e.g., operations that have not already cancelled each other out) to the shared stack and release the lock.

One embodiment of a method for creating and evaluating futures under a strong futures linearizability policy for applications (or computations thereof) that access a shared stack is illustrated by the flow diagram in FIG. 4C. As illustrated at 400, in this example, the method may include a thread (e.g., a thread of a multithreaded application) executing code that invokes an operation on a shared stack instance. The method may include allocating and enqueuing a future object for a future F on a shared queue of pending operations targeting the shared stack instance, and returning the future to the caller, as in 430.

As illustrated in this example, at some point later (e.g., after a future object has been created for the new operation and enqueued on the shared queue of pending operations), the method may include a thread (e.g., the same thread that invoked the new operation or a different thread) evaluating the future F. As illustrated in FIG. 4C, this may include acquiring the lock on the shared queue of pending operations, as in 432. Note that, in the example illustrated in FIG. 4C, the attempt to acquire the lock is assumed to be successful. However, if the attempt to acquire the lock is not successful, the method may proceed in a manner similar to that illustrated in FIG. 3. Once the lock has been acquired, the method may include the thread that acquired the lock (which may be referred to as the evaluating thread) beginning to traverse the shared queue of pending operations starting at the head of the queue, as in 434.

If the thread encounters a pending pop operation in the shared queue of pending operations for which there is a preceding push operation (shown as the positive exit from 436), the method may include the preceding push operation providing a result for the encountered pop operation (as in 438). In this case, both the encountered pop operation and the preceding push operation may be removed from the shared queue of pending operations. Conversely, if the thread encounters a pending push operation or a pending pop operation for which there is no preceding push operation (shown as the negative exit from 436) and there are more pending operations in the shared queue of pending operations that have not yet been examined (shown as the positive exit from 440), the method may include continuing to traverse the shared queue, and repeating the operations illustrated in 436-440 (as applicable). This is illustrated in FIG. 4C by the feedback from element 444 to element 436. As illustrated in this example, if, or once, there are no additional pending operations in the shared queue that have not been examined (shown as the negative exit of 440), the method may include applying any remaining operations in the shared queue to shared stack instance, and releasing the lock, as in 442.

Note that, in some embodiments of a shared stack implemented under a strong-FL policy, a method of a futures support module or futures support library may (e.g., in response to the creation of a new future) perform adding a future (or an operation thereof) to a shared queue of pending futures or operations to be performed on the shared stack, or may (e.g., prior to or as part of performing an evaluation of a future) perform an optimization operation on the shared queue of pending futures or operations (e.g., cancelling complementary pop/push operations in certain cases) and/or compute the result of a future (individually or in combination with the results of one or more other futures). In other embodiments, the shared stack may be implemented as an object for which such methods are defined.

Figure 5A:
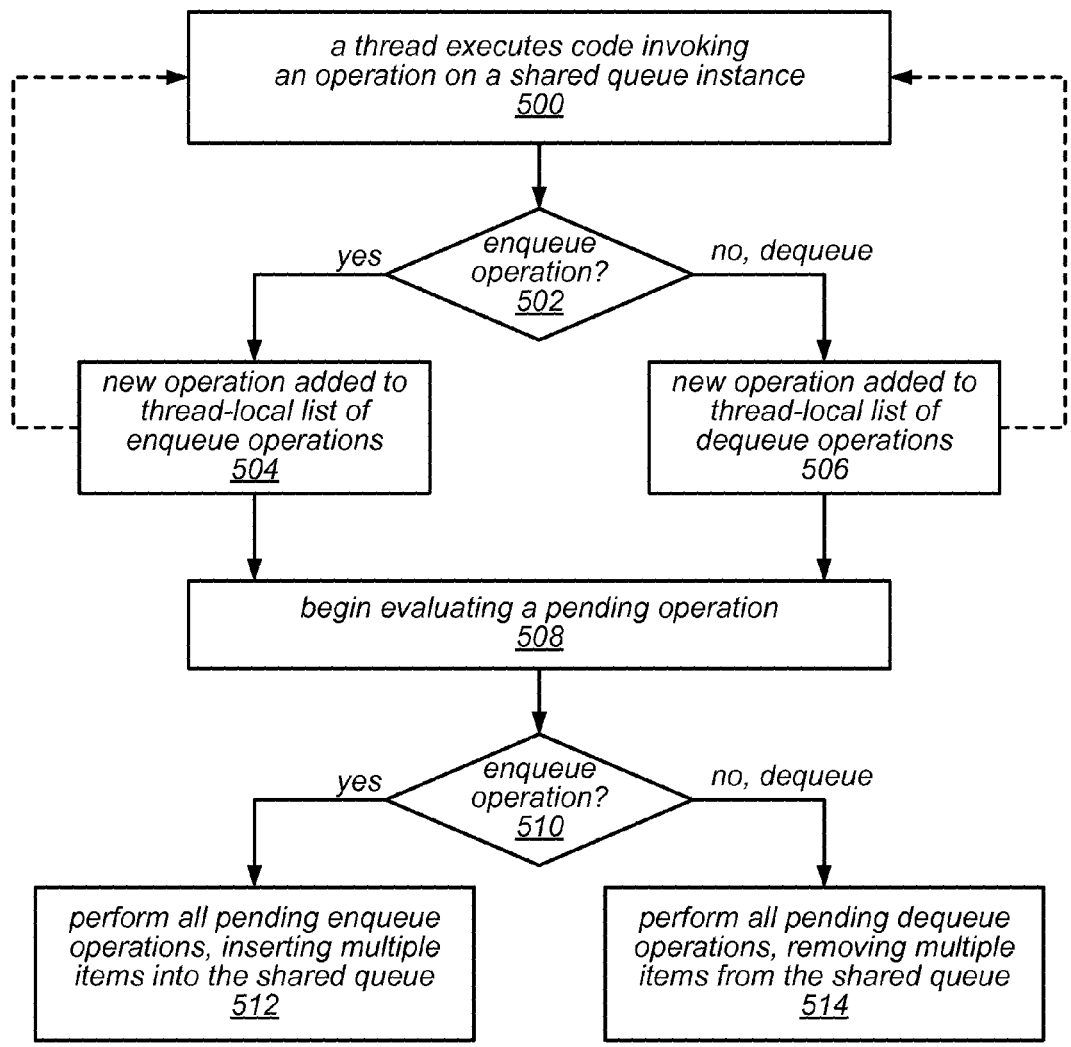
FIGS. 5A-5C are flow diagrams illustrating various embodiments of methods for creating and evaluating futures for applications (or computations thereof) that access a shared queue, according to different futures linearizability policies.
Figure 5B:
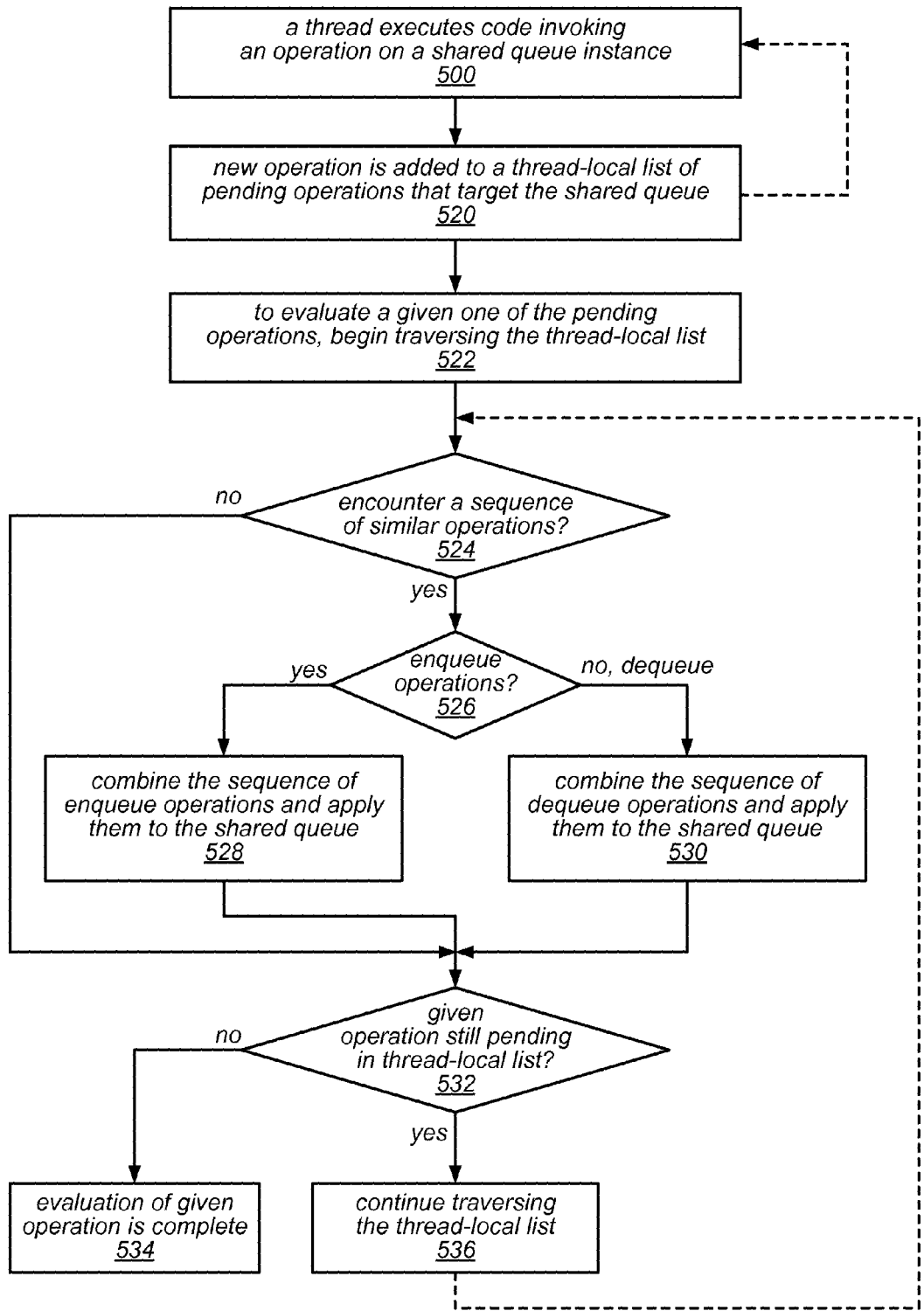
Figure 5C:
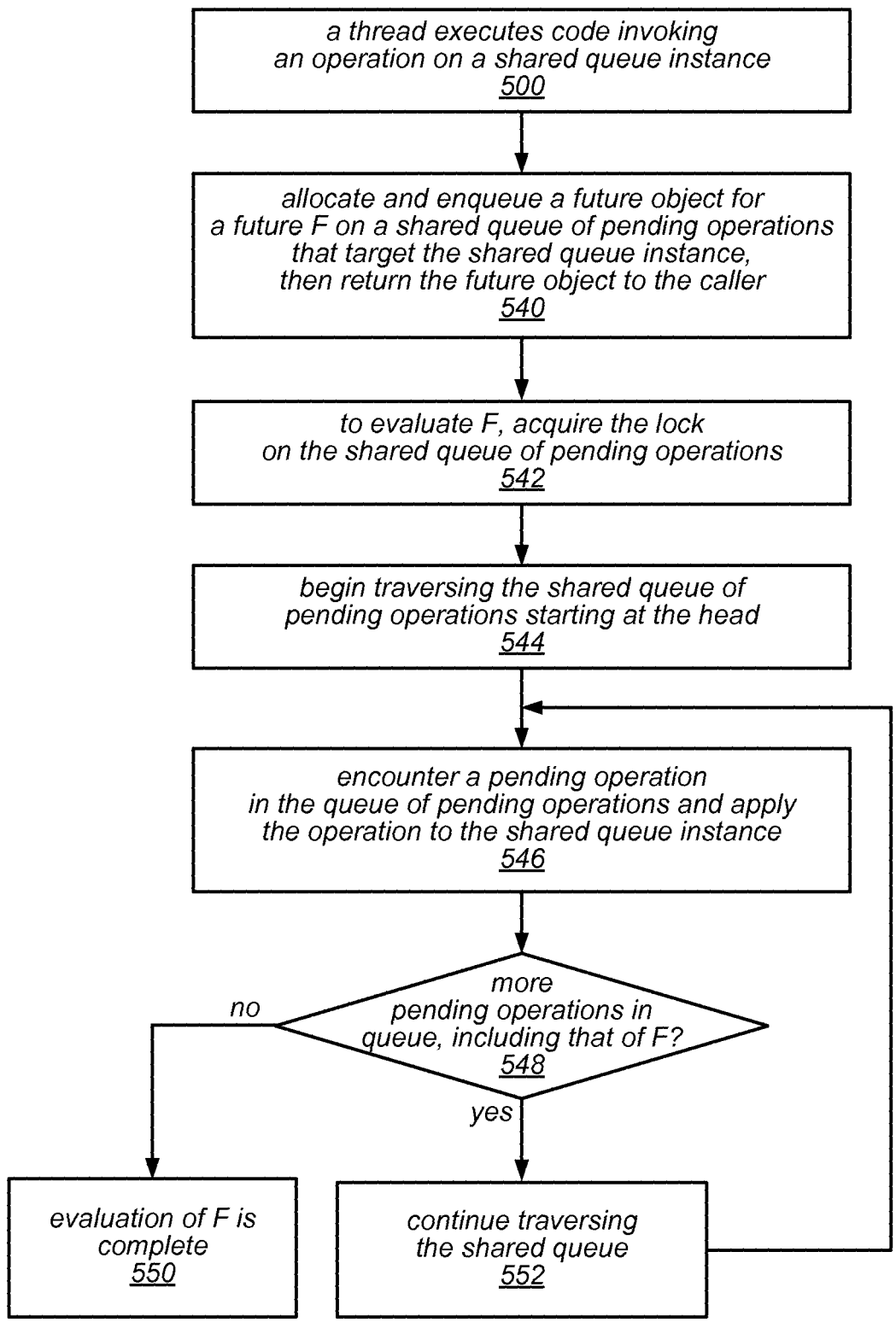

FIGS. 5A-5C are flow diagrams illustrating various embodiments of methods for creating and evaluating futures for applications (or computations thereof) that access a shared queue, according to different futures linearizability policies. Note that the semantics of queues may not allow operations to be eliminated as easily as operations that target stacks. However, the semantics of queues may allow efficient combining For a shared queue implemented under the weak-FL policy, each thread may keep two thread-local lists of pending operations, one for pending enqueue operations and another for pending dequeue operations. In some embodiments, when a future returned by a method call is evaluated, so are all futures of the same operation type. This may allow a number of operations to be combined, thus reducing the number of accesses to the shared queue instance. The latter may be achieved by inserting (or removing) multiple nodes into (or from) the shared queue, using just one (or two) CAS type operations, when combining pending enqueue or dequeue operations, respectively.

One embodiment of a method for creating and evaluating futures under a weak futures linearizability policy for applications (or computations thereof) that access a shared queue is illustrated by the flow diagram in FIG. 5A. As illustrated at 500, in this example, the method may include a thread (e.g., a thread of a multithreaded application) executing code that invokes an operation on a shared queue instance. If the operation is an enqueue operation (shown as the positive exit from 502), the method may include adding the new operation (in this case, a new enqueue operation) to a thread-local list of enqueue operations (e.g., enqueue operations indicated in pending futures, each of which is represented in the thread-local list by a respective future object), as in 504. Similarly, if the operation is not an enqueue operation (e.g., if the new operation is a dequeue operation, shown as the negative exit of 502), the method may include adding the new operation (in this case, a new dequeue operation) to a thread-local list of dequeue operations (e.g., dequeue operations indicated in pending futures, each of which is represented in the thread-local list by a respective future object), as in 506.

As illustrated in this example, at some point later (e.g., after the new operation has been handled as described above), the method may include a thread (e.g., the same thread that invoked the new operation or a different thread) beginning an evaluation of a pending operation (future object), as in 508. If the pending operation being evaluated is an enqueue operation, shown as the positive exit from 510, the method may include evaluating all pending enqueue operations in the thread-local list of pending enqueue operations, inserting multiple items into the shared queue instance (e.g., using two CAS type instructions) and then removing the future objects corresponding to those enqueue operations from the thread-local list of operations, as in 512. On the other hand, if the pending operation being evaluated is an dequeue operation, shown as the negative exit from 510, the method may include evaluating all pending dequeue operations in the thread-local list of pending dequeue operations, removing multiple items from the shared queue instance (e.g., using a single CAS type instruction) and then removing the future objects corresponding to those dequeue operations from the thread-local list, as in 514.

Note that, as indicated by the dashed lines from 504 to 500 and from 506 to 500 in FIG. 5A, a thread may invoke any number of operations that target the shared queue instance (and create and enqueue a corresponding number of future objects in the thread-local lists of enqueue and/or dequeue operations) before beginning to evaluate any of them or to perform any optimization operations, and may continue to invoke operations and create/enqueue corresponding future objects while optimizations are performed on the thread-local lists of enqueue and/or dequeue operations and/or while other futures are evaluated. Note that, in at least some embodiments, at least a portion of the method illustrated in FIG. 5A may be performed for the pending operations invoked by each thread of a multithreaded application (or a computation thereof) that accesses the shared queue instance.

As in other examples, in some embodiments of a shared queue instance implemented under the weak-FL policy, a method of a futures support module or futures support library may (e.g., in response to the creation of a new future) perform adding a future (or an operation thereof) to a thread-local list of pending futures or operations to be performed on the shared queue instance, or may (e.g., prior to or as part of performing an evaluation of the future) perform an optimization operation on the thread-local list of pending futures or operations and/or compute the result of a pending future (e.g., by applying a pending operation to the shared queue individually or in combination with one or more other pending operations). In other embodiments, the shared queue instance may be implemented as an object for which such methods are defined.

For a shared queue implemented under the medium-FL queue, a thread may evaluate a future F by traversing its local list, starting from the head (i.e., the oldest pending operation). The thread may remove a sequence of pending operations of the same type (e.g., either a sequence of enqueue operations or a sequence of dequeue operations), combine the operations in the sequence and apply those combined operations to the shared queue. This process may be repeated until F is evaluated. As in the previous example, multiple nodes may be inserted in or removed from the shared queue using two CAS type operations or a single CAS type operation, respectively.

One embodiment of a method for creating and evaluating futures under a medium futures linearizability policy for applications (or computations thereof) that access a shared queue is illustrated by the flow diagram in FIG. 5B. As illustrated at 500, in this example, the method may include a thread (e.g., a thread of a multithreaded application) executing code that invokes an operation on a shared queue instance. The method may include adding the new operation to a thread-local list of pending operations that target the shared queue instance (e.g., operations indicated in pending futures, each of which is represented by a respective future object), as in 520.

As illustrated in this example, at some point later (e.g., after the new operation has been handled as described above), the method may include a thread (e.g., the same thread that invoked the new operation or a different thread), in order to evaluate one of the pending operations (e.g., an operation indication in a pending future object), beginning to traverse the thread-local list of pending operations (future objects), as in 522. If, during traversal of the thread-local list, a sequence of similar operations is encountered in the thread-local list (e.g., a sequence of two or more enqueue operations in a row or a sequence of two or more dequeue operations in a row, as in 524), and if the sequence includes two or more enqueue operations (shown as the positive exit of 526), the method may include combining the enqueue operations in this sequence of enqueue operations and applying them to the shared queue instance (e.g., using two CAS type instructions), as in 528, and then removing the future objects corresponding to those enqueue operations from the thread-local list. On the other hand, if the sequence includes two or more dequeue operations (shown as the negative exit from 526), the method may include combining the dequeue operations in this sequence of dequeue operations and applying them to the shared queue instance (e.g., using a single CAS type instruction), as in 530, and then removing the future objects corresponding to those dequeue operations from the thread-local list.

As illustrated in this example, if, following the performance of the optimization operation described above (in which two or more pending operations are combined and applied to the shared queue instance collectively), the given operation (future) that is the target of the evaluation operation is still pending in the thread-local list (shown as the positive exit from 532), the method may include continuing to traverse the thread-local list. This is illustrated in FIG. 5B by element 536 and the dashed line from 536 to 524. However, if, following the performance of the optimization operation described above, the given operation is no longer pending in the thread-local list (shown as the negative exit from 532), the evaluation of given operation (future) may be complete, as in 534. Note that, in at least some embodiments, at least a portion of the method illustrated in FIG. 5B may be performed for the pending operations invoked by each thread of a multithreaded application (or a computation thereof) that accesses the shared queue instance.

As in other examples, in some embodiments of a shared queue instance implemented under the medium-FL queue, a method of a futures support module or futures support library may (e.g., in response to the creation of a new future) perform adding a future (or an operation thereof) to a thread-local list of pending futures or operations to be performed on the shared queue instance, or may (e.g., prior to or as part of performing an evaluation of the future) perform an optimization operation on the thread-local list of pending futures or operations, and/or compute the result of a pending future (e.g., by applying a pending operation to the shared queue instance individually or in combination with one or more other pending operations). In other embodiments, the shared queue instance may be implemented as an object for which such methods are defined.

For a shared queue implemented under the strong-FL policy, a thread that acquires the associated lock may traverse the queue of pending operations and apply them to the shared queue. One embodiment of a method for creating and evaluating futures under a strong futures linearizability policy for applications (or computations thereof) that access a shared queue is illustrated by the flow diagram in FIG. 5C. As illustrated at 500, in this example, the method may include a thread (e.g., a thread of a multithreaded application) executing code that invokes an operation on a shared queue instance. The method may include allocating and enqueuing a future object for a future F on a shared queue of pending operations targeting the shared queue instance, and returning the future to the caller, as in 540.

As illustrated in this example, at some point later (e.g., after a future object has been created for the new operation and enqueued on the shared queue of pending operations), the method may include a thread (e.g., the same thread that invoked the new operation or a different thread) evaluating the future F. As illustrated in FIG. 5C, this may include acquiring the lock on the shared queue of pending operations, as in 542. Note that, in the example illustrated in FIG. 5C, the attempt to acquire the lock is assumed to be successful. However, if the attempt to acquire the lock is not successful, the method may proceed in a manner similar to that illustrated in FIG. 3. Once the lock has been acquired, the method may include the thread that acquired the lock (which may be referred to as the evaluating thread) beginning to traverse the shared queue of pending operations starting at the head of the queue, as in 544.

As illustrated in this example, during traversal of the shared queue of pending operations, the method may include encountering a pending operation and applying that operation to the shared queue instance that is the target of the operation, as in 546, after which the pending operation may be removed from the shared queue of pending operations. If (or while) there are more pending operations in the shared queue of pending operations that target the shared queue instance, including the pending operation indicated in the future object for F (shown as the positive exit from 548), the method may include continuing to traverse the shared queue. This is illustrated in FIG. 5C by element 552 and the feedback from 552 to 546. If (or once) there are no more pending operations in the shared queue of pending operations (shown as the negative exit from 548), the evaluation of future F may be complete, as in 550.

Note that, in some embodiments of a shared queue instance implemented under the strong-FL policy, a method of a futures support module or futures support library may (e.g., in response to the creation of a new future) perform adding a future (or an operation thereof) to a shared queue of pending futures or operations to be performed on the shared queue instance or may (e.g., prior to or as part of performing an evaluation of a future) perform an optimization operation on the shared queue of pending futures or operations and/or compute the result of a future (individually or in combination with the results of one or more other futures). In other embodiments, the shared queue instance may be implemented as an object for which such methods are defined.

Figure 6A:
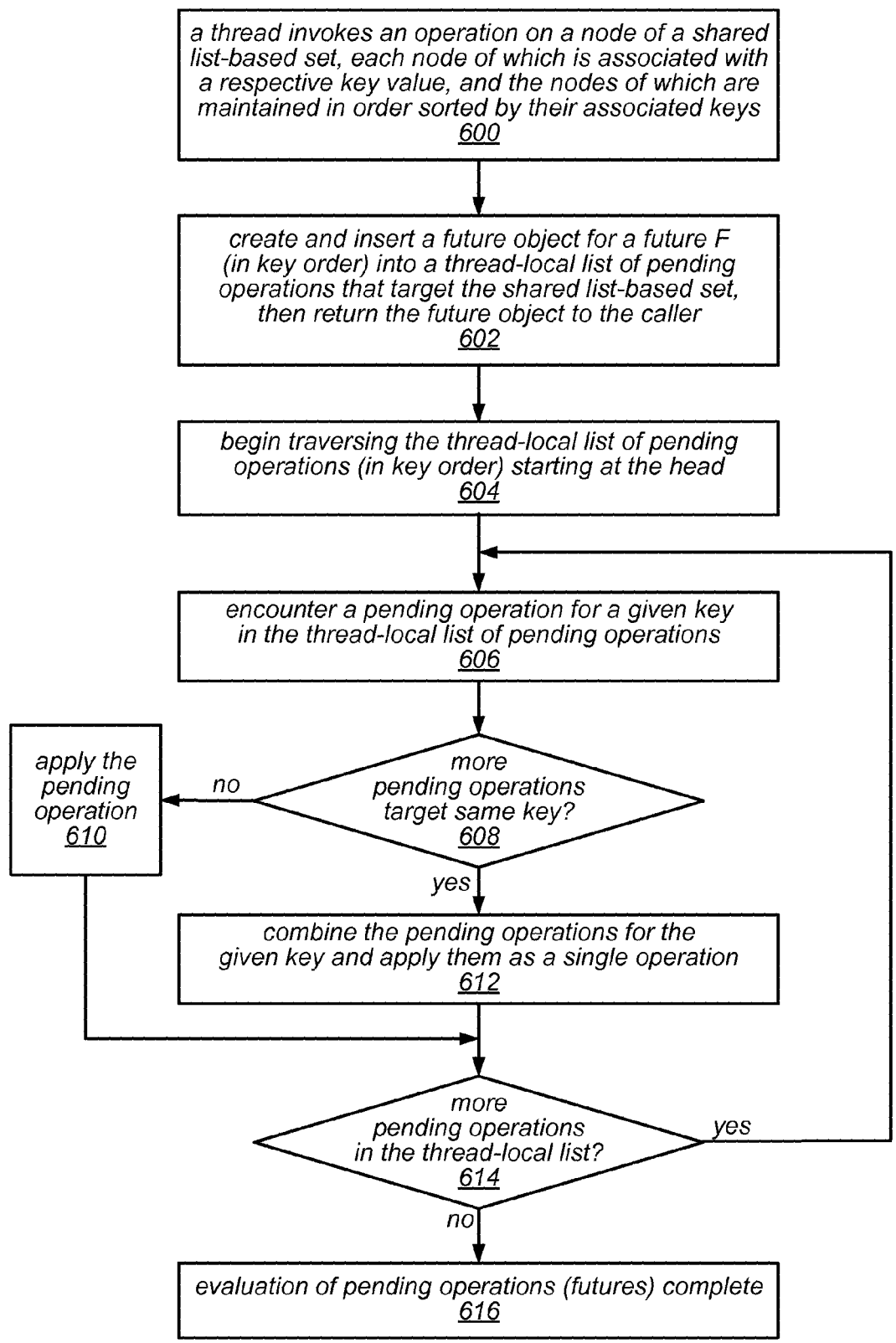
FIGS. 6A-6C are flow diagrams illustrating various embodiments of methods for creating and evaluating futures for applications (or computations thereof) that access a shared list-based set, according to different futures linearizability policies.
Figure 6B:
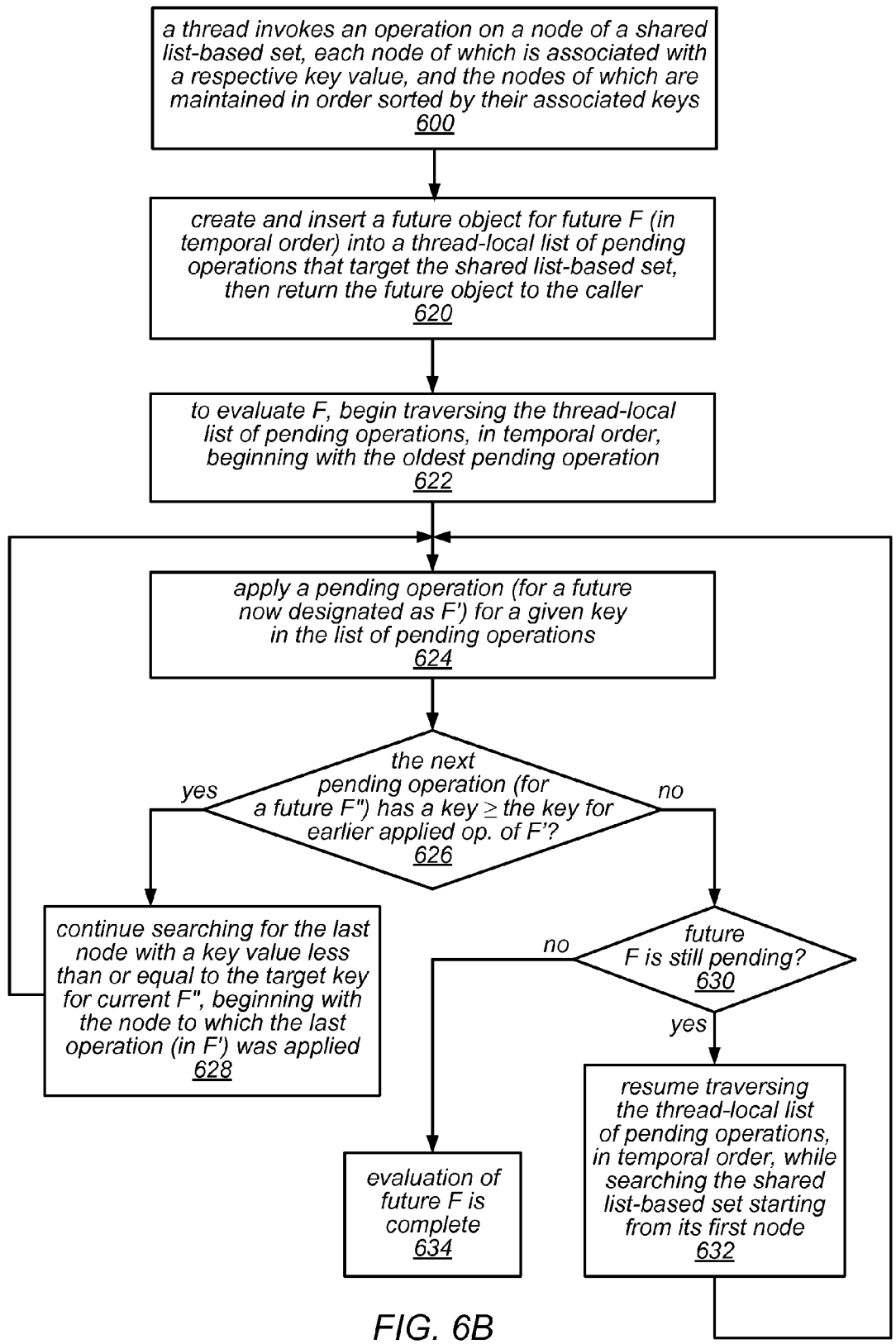
Figure 6C:
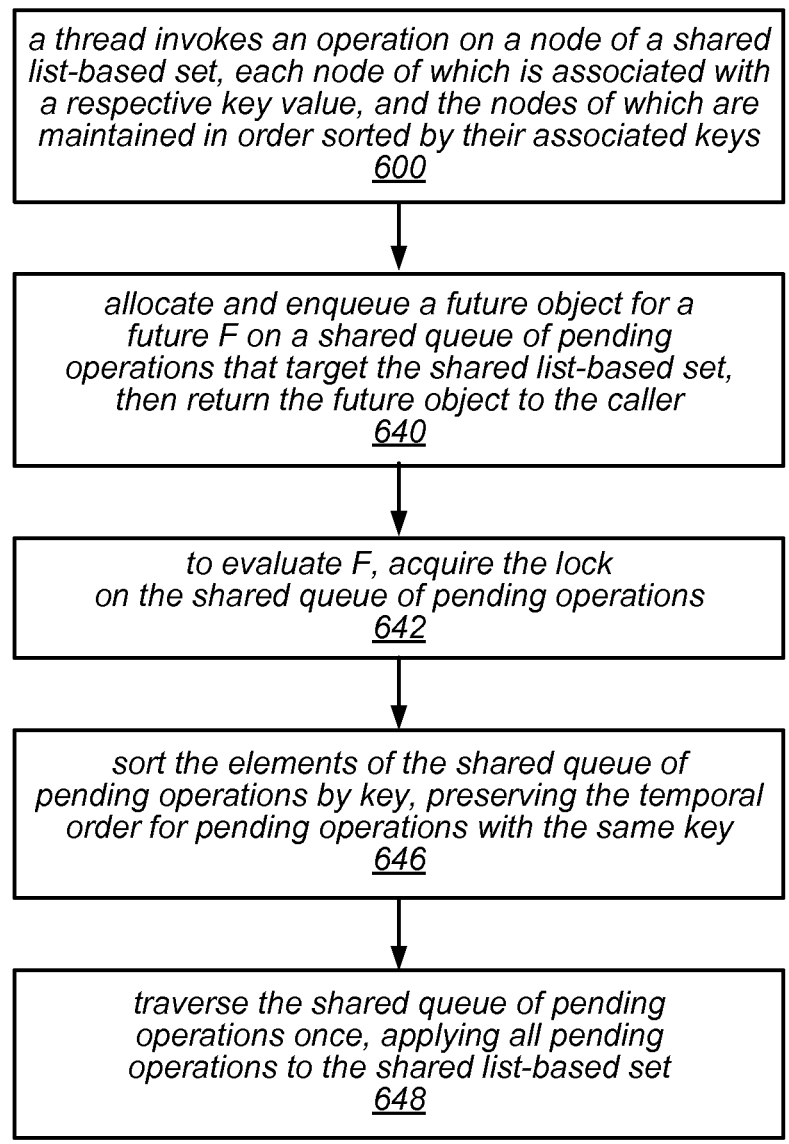

FIGS. 6A-6C are flow diagrams illustrating various embodiments of methods for creating and evaluating futures for applications (or computations thereof) that access a shared list-based set, according to different futures linearizability policies. In these examples, each element of the list-based set (which may, in some ways, be similar to a linked list) is associated with (and/or includes) a respective key. In some embodiments of these list-based sets, there may be limited opportunities for performing combining and elimination, such as when pending operations target the same node (i.e., when operations include the same key). However, it may be more likely that there are opportunities to optimize (e.g., to reduce) the number of traversals of the list-based set. For example, in various embodiments (e.g., implementations under strong-FL, medium-FL, or weak-FL policies), if there are several pending operations on nodes with different keys, optimizations may be performed on a list or queue of pending operations (and/or on the list-based set itself) in order to allow an evaluating thread to traverse the list-based set just once (or a reduced number of times) while applying multiple operations to various nodes in the list-based set.

For a shared list-based set implemented under the weak-FL policy, a thread-local list of pending operations (e.g., operations to insert a new key, remove a key, and/or lookup/search for a key) may be maintained by each thread, and may be sorted by key. The thread-local list of pending operations (which may be implemented as an array, in some embodiments) may be thought of as a local buffer in which operations are stored before they are eventually applied (in key order) to the nodes of the shared list-based set. In some embodiments, a thread may evaluate a future by traversing the shared list-based set (which also maintains nodes in order sorted by their keys) and applying the pending operations from its thread-local list of pending operations. More specifically, for each key included in an operation in its thread-local list of pending operations, the evaluating thread may check if a node with that key is present in the shared list-based set. If so (or if the operation involves the insertion of a node with a new key), the evaluating thread may apply the operation to the target node, and then examine the next operation in its thread-local list of pending operations (and its key). In some embodiments, multiple pending operations with the same key may be combined, so that at most one modification per key is performed on the shared list-based set by any given thread. This implementation may allow a thread to traverse the shared list-based set just once in order to apply all of its pending operations.

One embodiment of a method for creating and evaluating futures under a weak futures linearizability policy for applications (or computations thereof) that access a shared list-based set is illustrated by the flow diagram in FIG. 6A. As illustrated at 600, in this example, the method may include a thread (e.g., a thread of a multithreaded application) invoking an operation on a node of a shared list-based set, each node of which is associated with a respective key value, and the nodes of which are maintained in order sorted by their associated keys. In some embodiments, the node in the shared list-based set that is the target of the operation may be identified by a key value that is included in the request (i.e., the key that is associated with the node that is the target of the operation). The method may include creating and inserting (in key order) a future object for a future F into a thread-local list of pending operations that target the shared list-based set (e.g., operations indicated in pending futures, each of which is represented in the thread-local list by a respective future object), and returning the future object to the caller, as in 602. In some embodiments, one method (e.g., an insert method of a futures support module) may be invoked to store the future object for F in the thread-local list and another method (e.g., a sort method of the futures support module) may be invoked to sort the future objects in the thread-local list by the keys that are included in those objects to identify the targets of their operations (e.g., in response to the insertion of the future object for F or at another time). In other embodiments, a single method may be invoked to insert the future object for F into the thread-local list in key order.

As illustrated in this example, at some point later (e.g., after the new operation has been handled as described above), the method may include a thread (e.g., the same thread that invoked the new operation or a different thread) beginning an evaluation of a pending operation (future object), which may involve computing the results of multiple pending operations (or all of the pending operations) in the thread-local list of pending operations. This may include beginning to traverse the thread-local list of pending operations (in key order) starting at the head of the list, as in 604. During traversal of the thread-local list of pending operations, the method may include encountering a pending operation for a given key in the thread-local list of pending operations (as in 606). If there are more pending operations in the thread-local list that target the same key (i.e., operations that target the node with the given key), shown as the positive exit from 608, the method may include combining the pending operations for the given key and applying them as a single operation to the node in the list-based set that is associated with the given key, as in 612. However, if there are no other pending operations in the thread-local list that target the same key, shown as the negative exit from 608, the method may include applying the encountered pending operation to the node in the list-based set that is associated with the given key as an individual operation, as in 610.

Once the encountered pending operation has been applied to the node in the list-based set that is associated with the given key (either individually or in combination with one or more other pending operations), the method may include determining whether there are more pending operations in the thread-local list of pending operations, as in 614. If so (shown as the positive exit from 614), the method may include continuing to traverse the thread-local list, and repeating the operations illustrated at 606-614 for the additional pending operations (future objects). This is illustrated in FIG. 6A by the feedback from the positive exit of 614 to 606. If (or once) there are no additional pending operations in the thread-local list of pending operations (shown as the negative exit from 614), the evaluation of pending operations may be complete, as in 616. Note that, in at least some embodiments, at least a portion of the method illustrated in FIG. 6A may be performed for the pending operations invoked by each thread of a multithreaded application (or a computation thereof) that accesses the shared list-based set.

As in previous examples, in some embodiments of a list-based set implemented under a weak-FL policy, a method of a futures support module or futures support library may (e.g., in response to the creation of a new future) perform adding a future (or an operation thereof) to a thread-local list of pending futures or operations to be performed on the shared list-based set (e.g., in key order), or may (e.g., prior to or as part of performing an evaluation of the future) perform an optimization operation on a thread-local list of pending futures or operations (e.g., combining multiple operations that target the same key, or sorting pending operations in key order) and/or compute the result of the future (e.g., by applying a pending operation individually or in combination with one or more other pending operations). In other embodiments, the shared list-based set may be implemented as an object for which such methods are defined.

The use of futures in an implementation of a shared list-based set under a weak-FL policy may be further illustrated by the following example. At some point, in this example, the shared list-based set includes three elements containing keys 3, 5, and 7, respectively, and a thread-local list of pending operations includes elements representing the operations "insert element with key 2" and "search for an element with key 8". In this example, when an element representing a new operation "remove the element with key 5" is inserted into the thread-local list of pending operations, it may be inserted into the list in key-sorted order (e.g., between the elements representing the operations "insert element with key 2" and "search for an element with key 8").

Subsequently, to resolve all of the pending operations on the thread-local list and apply these operations to the shared list-based set, the thread (or another evaluating thread) may examine the first element of the shared list (which includes key 3), and the first operation on the thread-local list of pending operations. The first operation targets an element with key 2, which does not exist in the shared list-based set. Therefore, the thread may insert an element with key 2 in the shared list-based set (in a position preceding the element with key 3) and move on to the next operation in the thread-local list. At this point, the shared list-based set includes four elements having keys 2, 3, 5, and 7, respectively, and the thread is examining an element that contains the key 3 in the shared list and an operation for key 5 in the local list. Therefore, the thread moves to the next element in the shared list-based set, which includes the key 5. Since the pending operation being examined is "remove the element with key 5", the thread may apply this operation on the shared list-based set.

At this point, the list-based set includes three elements having keys 2, 3, and 7, respectively. As the thread moves over the list-based set and the thread-local list of pending operations, it encounters an element with the key 7 on the shared list-based set and an operation with the key 8 on the thread-local list of pending operations. Since 7 is less than 8, the thread may move to the next element in the shared list-based set (which doesn't exit). Therefore, the thread will decide an element having the key 8 does not exist in the list-based set, and will set the return value for the operation "search for an element with key 8" appropriately (e.g., to indicate that no element with key 8 was not found).

While the example above illustrates an implementation of a very small list-based set under a weak-FL policy, with this approach, even when the list-based set a very large (e.g., when it contains hundreds or many thousands of elements) an evaluating thread may only need to go over the list-based set once in order to apply all of its pending operations. In some embodiments, this approach may be well suited for situations in which a thread-local list of pending operations is relatively short, but the shared list-based set that these operations target can be any length, and may be used to reduce the number of times a thread must iterate over the shared list-based set. In some embodiments, a number of pending operations may be batched (e.g., may be stored, in key order, in a thread-local list of pending operations, where they are represented by corresponding future objects) and then may be applied to the shared list-based set in one pass.

Due to ordering restrictions on the operations of a single thread, a list-based set implemented under the medium-FL policy may keep each thread's local list of pending operations sorted in temporal order, rather than by key. In some embodiments, a thread may evaluate a future F by traversing the thread-local list, starting from the oldest operation, and applying pending operations subject to the following optimization. In some embodiments, all operations on the shared list-based set may employ an auxiliary search function that accepts a given key and traverses the list-based set, looking for the last node holding a value less than or equal to the given key. When finished applying a pending operation op, if the next pending operation has a key larger than or equal to the key of op, the thread may resume searching from the position in the shared list-based set at which op was applied. Otherwise, and if F has not yet been evaluated, the thread may resume searching from the head of the list. Note that in some embodiments, for a list-based set implemented under the medium-FL policy, each of the future objects that represent a pending operation on the list-based set may include a timestamp or sequence number, which may be used to ensure that pending operations are sorted (and stored in the thread-local list of pending operations) in temporal order.

One embodiment of a method for creating and evaluating futures under a medium futures linearizability policy for applications (or computations thereof) that access a shared list-based set is illustrated by the flow diagram in FIG. 6B. As illustrated at 600, in this example, the method may include a thread (e.g., a thread of a multithreaded application) invoking an operation on a node of a shared list-based set, each node of which is associated with a respective key value, and the nodes of which are maintained in order sorted by their associated keys. In some embodiments, the node in the shared list-based set that is the target of the operation may be identified by a key value that is included in the request (i.e., the key that is associated with the node that is the target of the operation). The method may include creating and inserting (in temporal order) a future object for a future F into a thread-local list of pending operations that target the shared list-based set (e.g., operations indicated in pending futures, each of which is represented in the thread-local list by a respective future object), and returning the future object to the caller, as in 620. In some embodiments, an insert method of a futures support module may be invoked to store the future object for F in the thread-local list.

As illustrated in this example, at some point later (e.g., after the new operation has been handled as described above), the method may include a thread (e.g., the same thread that invoked the new operation or a different thread) beginning an evaluation of F, which may include beginning to traverse the local list of pending operations, in temporal order, starting with the oldest pending operation (as in 622). The method may include applying to the list-based set a pending operation for a given key that is encountered when traversing the thread-local list of pending operations (e.g., the oldest pending operation), as in 624. For the purposes of this description, the future that includes the operation applied at 624 may (at this point) be referred to as F'. If the next pending operation in the thread-local list of pending operations (i.e., the next oldest pending operation, which is an operation included in a future that at this point may be referred to as F''') has a key that is greater than or equal to the key for the earlier applied operation of the future currently designated as F' (shown as the positive exist of 626), the method may include continuing to search for the last node in the shared list-based set that is associated with a key value that is less than or equal to the target key for the future currently designated as F''', beginning with the node to which the last operation (an operation of the future currently designated as F') was applied (as in 628).

As illustrated in this example, if the next pending operation in the thread-local list of pending operations (i.e., the next oldest pending operation, for the future currently designated as F''') does not have a key that is greater than or equal to the key for the earlier applied operation of the future currently designated as F' (shown as the negative exist of 626), and the operation indicated in future F is still pending on the thread-local list of pending operations (shown as the positive exit from 630), the method may include resuming the traversal of the thread-local list of pending operations, in temporal order (e.g., beginning with oldest remaining pending operation) while searching the shared list-based set starting from its first node, and continuing to evaluate pending operations (future objects) until the operation indicated in future F has been applied to the shared list-based set. This is illustrated in FIG. 6B by the feedback from element 632 to 624. On the other hand, if the next pending operation in the thread-local list of pending operations (i.e., the next oldest pending operation, for the future currently designated as F") does not have a key that is greater than or equal to the key for the earlier applied operation of the future currently designated as F' (shown as the negative exist of 626), but the operation indicated in future F is no longer pending on the thread-local list of pending operations (shown as the negative exit from 630), the evaluation of future F may be complete, as in 634. Note that, in at least some embodiments, at least a portion of the method illustrated in FIG. 6B may be performed for the pending operations invoked by each thread of a multithreaded application (or a computation thereof) that accesses the shared list-based set.

As in previous examples, in some embodiments of a shared list-based set implemented under a medium-FL policy, a method of a futures support module or futures support library may (e.g., in response to the creation of a new future) perform adding a future (or an operation thereof) to a thread-local list of pending futures or operations to be performed on the shared list-based set (e.g., in temporal order), or may (e.g., prior to or as part of performing an evaluation of a future) perform an optimization operation on a thread-local list of pending futures or operations and/or compute the result of a future (individually or in combination with the results of one or more other futures). In other embodiments, the shared list-based set may be implemented as an object for which such methods are defined.

If the example list-based set described above was instead implemented under the medium-FL policy, the pending operations could not simply be sorted in order of their keys. Instead, the temporal order of operations must be preserved. In this example, if the shared list-based set includes three elements containing keys 3, 5, and 7, respectively, and operations targeting the shared list-based set were received in the following order: "insert element with key 2", "search for an element with key 8", and then "remove the element with key 5", the operation "remove the element with key 5" cannot be performed before the operation "search for an element with key 8" is finished. However, under the medium-FL policy, it may be possible to optimize the performance if (by chance) operations are received in increasing order of keys. In that case, futures may be exploited and may serve to reduce the number of times the shared list-based set must be traversed. For example, the operations "insert element with key 2" and "search for an element with key 8" may be applied on the same pass over the shared list-based set. In other words, one optimization that may be performed for a list-based set implemented under the medium-FL policy may involve running over the list-based set as long as there are pending operations encountered that happen to be stored in the thread-local list of pending operations in increasing order of their keys.

Finally, in some embodiments of a shared list-based set implemented under the strong-FL linked list implementation, a thread that evaluates a future may acquire the shared lock associated with the shared list-based set. Once the lock has been acquired, the thread may run through the shared queue of pending operations, and sort the operations by key. The sort may be stable, meaning that the temporal (linearization) order of operations with the same key is preserved. The thread may then traverse the shared list-based set just once, applying all of the pending operations, in the sorted order, before releasing the lock.

One embodiment of a method for creating and evaluating futures under a strong futures linearizability policy for applications (or computations thereof) that access a shared list-based set is illustrated by the flow diagram in FIG. 6C. As illustrated at 600, in this example, the method may include a thread (e.g., a thread of a multithreaded application) invoking an operation on a node of a shared list-based set, each node of which is associated with a respective key value, and the nodes of which are maintained in order sorted by their associated keys. In some embodiments, the node in the shared list-based set that is the target of the operation may be identified by a key value that is included in the request (i.e., the key that is associated with the node that is the target of the operation). The method may include allocating and enqueuing a future object F on a shared queue of pending operations targeting the shared list-based set, and returning the future to the caller, as in 640.

As illustrated in this example, at some point later (e.g., after a future object has been created for the new operation and enqueued on the shared queue of pending operations), the method may include a thread (e.g., the same thread that invoked the new operation or a different thread) evaluating the future object F. As illustrated in FIG. 6C, this may include acquiring the lock on the shared queue of pending operations, as in 642. Note that, in the example illustrated in FIG. 6C, the attempt to acquire the lock is assumed to be successful. However, if the attempt to acquire the lock is not successful, the method may proceed in a manner similar to that illustrated in FIG. 3. Once the lock has been acquired, the method may include the thread that acquired the lock (which may be referred to as the evaluating thread) sorting the elements of the shared queue of pending operations by key, preserving the temporal order for pending operations with the same key, as in 646. The method may also include this thread traversing the shared queue of pending operations once, applying all pending operations to the shared list-based set, as in 648.

As in previous examples, in some embodiments of a shared list-based set implemented under a strong-FL policy, a method of a futures support module or futures support library may (e.g., in response to the creation of a new future) perform adding a future (or an operation thereof) to a shared queue of pending futures or operations to be performed on the shared list-based set, or may (e.g., prior to or as part of performing an evaluation of a future) perform an optimization operation on a thread-local list of pending futures or operations (e.g., sorting them by key while preserving temporal order for operations having the same key) and/or compute the result of a future (individually or in combination with the results of one or more other futures). In other embodiments, the shared list-based set may be implemented as an object for which such methods are defined.

Note that while various extensions to futures linearizability have been described herein in terms of specific futures linearizability policies and their application to the implementation of specific shared data structures (including the use of type-specific optimizations), these implementations are merely examples of the use of these techniques, and are not intended to be limiting. In other embodiments, the techniques described herein for improving the performance of multithreaded applications that access shared data structures by exploiting these redefined futures may be applied in other contexts. For example, other futures linearizability policies may be defined that make different trade-offs between determinism and the flexibility to apply optimizations than the three policies described in detail herein. In another example, these techniques may be applied when implementing data structures other then the types of shared data structures described herein (e.g., stacks, queues, and list-based sets), and different type-specific optimization operations may be applied to lists or queues of pending operations that target those data structures. In yet another example, the selection of a particular futures linearizability policy (from among multiple such policies) that is to be applied in a given situation may be configurable (e.g., statically, according to various parameter values, or dynamically, based on the current state of an application or shared object, or based on an observed workload).

Performance

The futures-based implementations described above were compared to several well-known lock-free alternatives, including an existing lock-free queue, an existing lock-free linked list, and an existing lock-free stack. To avoid effects of memory management on the results, the memory required by any implementation was pre-allocated. A simple benchmark was used in which each thread performs a preset number (100K) of operations on a data structure, initialized as described below. The operations were chosen randomly from distributions described below.

A future-based implementation must choose how many pending operations to permit, a quantity that may be referred to as slack. Experiments were performed with different choices of slack, as follows: after every X (=slack) operations returning futures (where X is 1, 10, 20 or 100), the thread evaluates all those futures before proceeding with the next X operations. For X=1, each future is evaluated immediately, allowing a direct comparison between the overheads of the future-based versus lock-free implementations. The number of threads was varied between 1 and 64, and the time for all threads to complete their operations was measured. The mean results were computed for 10 runs performed with exactly the same parameters. The variance of most of the results was found to be negligible.

In experiments involving the stack benchmark, the performance was measured with different values for the slack. In each of these experiments, the stack was initially empty, and each thread executed 100K operations, choosing between push and pop operations with equal probability. With slack=1, the futures-based stacks performed on par or slightly worse than the existing lock-free stack, due to the additional overhead required for managing local lists of pending operations (for the weak-FL and medium-FL versions) or managing the shared queue and lock (for the strong-FL version). However, as the slack was increased, the weak-FL and medium-FL stacks significantly outperformed the lock-free stack, e.g., by up to two orders of magnitude. It was found that the gap between those two future-based stacks decreased with the increase in slack. This is because the medium-FL stack managed to eliminate more operations, thus accessing the shared stack less frequently. Interestingly, the strong-FL stack performed competitively with the lock-free counterpart, and even slightly outperformed it on high thread counts. This is believed to be because the contention on the head of the stack in the lock-free stack is more severe than on the access to the shared queue of pending operations and on the lock protecting this queue in the strong-FL stack.

In experiments involving the queue benchmark, the performance was measured with different values for the slack. In each of these experiments, the queue was initially empty, and each thread executed 100K operations, choosing between enqueue and dequeue operations with equal probability. As with stacks, both weak-FL and medium-FL queues performed like the existing lock-free queue when slack=1. However, the strong-FL queue performed almost two times worse than the lock-free queue, and this gap remained the same even when increasing the slack. The reasons are twofold. First, while in the strong-FL queue all threads insert new pending operations at the tail of the queue (of pending operations), the shared queue in the existing lock-free version is accessed from both ends, experiencing less contention. Second, queue semantics dictate that queue operations cannot be eliminated as aggressively as stack operations. Thus, the synchronization overhead of evaluating pending operations is not compensated by elimination.

In these experiments, the performance of the medium-FL queue relative to the existing lock-free queue stayed the same when slack>1. This is because, in the medium-FL queue, future evaluation combines sequences of operations of the same type (as described above). Note that increasing the bound on the number of pending futures did not significantly increase the chance of encountering larger sequences. The weak-FL queue benefited from increasing the slack, as it was able to combine operations more aggressively. As the number of threads increased, however, the running time for this version spiked sharply. Interestingly, the spike occurred at increasing thread counts as the slack increases. This is because, even with aggressive combining, this version encounters contention on the shared queue with the increased number of threads. For example, by calculating the average number of CAS type operations issued by the weak-FL version per one high-level operation on the shared queue, it was discovered that there was a clear correlation between the running time of the weak-FL version and the average number of CAS type operations.

In experiments involving the list benchmark and the list-based set implementation described herein, the performance was measured with different values for the slack. In each of these experiments, the list was initialized with a number of randomly chosen keys. The number of keys was equal to half of the key range, which was set to 10K. Each thread executed 100K operations that included randomly selected insert operations (20%), remove operations (20%), and contains (search) operations (60%). Each operation returned a Boolean flag indicating whether the list was changed or the required key was found. As in the stack and queue experiments, the performance of the weak-FL list improved relative to the performance of the existing lock-free list as the slack increased. This is because more operations were combined and applied together while traversing the shared list just once. The medium-FL list achieved better performance than the existing lock-free list when slack>1, but the relative gap stayed constant. This is because, just as for queues, increasing the slack does not significantly increase the chance to apply more operations in one list traversal.

In these experiments, as in the previous case, the performance of the strong-FL list was significantly worse relative to all other versions when slack=1. However, once the slack increased, the strong-FL list outperformed the existing lock-free alternative (and the medium-FL list). This is because it enabled one thread to effectively combine multiple pending operations produced by other threads, while those threads continued to work in parallel on producing new operations. Given that the strong-FL property implies the medium-FL property, this example shows that, at least in some prototype implementations, the stronger correctness condition does not necessarily imply worse performance.

As previously noted, futures were originally proposed for side-effect-free computations. An alternative proposal for implementing futures in languages in which side effects are common specifies that futures should satisfy strong futures linearizability and does not consider type-specific optimizations. Unlike the multicore systems described herein that utilize futures to access and operate on shared objects, an existing system that employs call streams and promises operates to batch a collection of service calls (e.g., in a distributed system in which service calls are directed to remote machines) to reduce communication costs. In this existing system, execution of the batched calls are pipelined and their answers are obtained later. However, it does not employ the types of optimizations described herein (e.g., type-specific optimizations that include combining and/or elimination operations). Another existing system employs dual data structures, which are objects whose methods are split into a request method that registers the invocation and returns a ticket, and a follow-up method that takes the ticket as an argument, and returns either the request's response or a "not ready" indicator (for example, if trying to dequeue from an empty queue). These dual data structures provide a new way to implement linearizable partial methods. However, they rely primarily on a polling mechanism, rather than being able to force the evaluation of an operation that has not yet been performed.

In contrast to these existing approaches, the systems described herein may use futures as a means of deploying highly-concurrent, type-specific techniques for scalable shared-memory data structures, including long-lived shared data structures. As previously noted, futures may provide a systematic and clean way to encapsulate a variety of optimization techniques, including elimination (in which operations cancel one another without synchronizing at a shared object that is the target of the operations), combining (in which multiple operations are combined into a single operation that is applied to the shared object) and flat combining (in which a single thread executes method calls on behalf of multiple concurrent threads). It has been shown that, in the context of long-lived shared data structures, futures may enable multiple efficient optimizations, such as combining, elimination, flexible evaluation scheduling, contention reduction, etc. As described herein, in order to make effective use of futures and to define which optimizations are permitted, several correctness conditions have been proposed and evaluated, each extending linearizability. Three standard data structures (queues, stacks and list-based sets) satisfying different correctness conditions have been constructed and their performance has been compared with some existing lock-free alternatives. It has been shown that, in most cases, the versions of the data structures satisfying the weakest correctness condition provide significantly better performance, e.g., up to two orders of magnitude. Furthermore, even the versions satisfying the strongest correctness condition substantially outperform the lock-free alternatives in certain cases.

Formal Model

In a standard linearizability model, threads may generally be assumed to be sequential (i.e., they may perform one method call at a time). However, this condition may be relaxed for method calls that return futures, allowing method calls issued by a single thread to overlap in constrained ways. In the formal models described below, each method call may be split into two events: an invocation event and a later response event. An execution of a concurrent system may be modeled by a history, which is a finite sequence of method invocation and response events. A sub-history of a history H is a subsequence of the events of history H. A method invocation may be written as (x m A), where x is an object, m a method name (and arguments) and A is a thread. A method response may be written as (x t A) where t is either "OK" (indicating successful completion) or an exception. In some cases, an event labeled with thread A may be referred to as a step of A.

In the formal models described herein, a response may be said to match an invocation if they have the same object and thread. A method call in a history H is a pair consisting of an invocation and the next matching response. For a method call m, its delimiting events may be denoted inv (m) and res (m). An invocation is pending in H if no matching response follows the invocation. An extension of H is a history constructed by appending responses to zero or more pending invocations of H. The history complete (H) is the subsequence of H consisting of all matching invocations and responses. For a thread A, the thread sub-history, H|A is the subsequence of events in H whose thread names are A. For an object x, the object sub-history H|x is similarly defined. Histories H and H' are equivalent if for every thread A, H|A=H'|A. A thread or object history may be said to be well-formed if every response has an earlier matching invocation.

In the formal models described herein, a method call $m_0$ precedes a method call $m_1$ in history H if $m_0$ finished before $m_1$ started, that is, the response event for $m_0$ occurs before the invocation event for $m_1$ in H. Precedence defines a partial order on the method calls of H as follows: $m_0 <_H m_1$. A history H may be referred to as sequential if the first event of H is an invocation, and each invocation, except possibly the last, is immediately followed by a matching response. If S is a sequential history, then $<_S$ is a total order. A sequential specification for an object is a prefix-closed set of sequential histories for the object. A sequential history H is legal if each object sub-history H|x is legal for x. For a history H, a partial order< extends $<_H$ if for method calls $m_0$, $m_1$ of H, $m_0 <_H m_1$ implies $m_0 < m_1$, but not necessarily vice-versa. Note that different choices for < may correspond to the strong, medium, and weak futures linearizability policies described herein.

According to one definition, for a history H, and partial order< extending $<_H$, H is <-linearizable if it has an extension H' and there is a legal sequential history S such that complete (H') is equivalent to S, and such that if method call $m_0 <_H m_1$ in H, then $m_0 <_S m_1$ in S. This definition may serve to generalize the usual notion of linearizability in two ways: first, thread histories are not required to be sequential, and second, it requires that $<_S$ extends<, which is stronger than the standard requirement that $<_S$ extends $<_H$.

According to one property definition, a method is total if it is defined for every object state. For example, a dequeue method that throws an exception on an empty queue may be referred to as a total method. Like linearizability (and unlike serializability), <-linearizability is non-blocking In other words, a pending invocation of a total method may never be required to wait for another pending invocation to complete. This non-blocking property may be described by the following theorem: Let inv (m) be an invocation of a total method. If (x inv P) is a pending invocation in a <-linearizable history H, then there exists a response (x res P) such that H·(x res P) is also <-linearizable. This theorem implies that <-linearizability by itself never forces a thread with a pending invocation of a total method to block. Like linearizability (and unlike sequential consistency), <-linearizability is compositional. This property may be described by the following theorem: H is <-linearizable if, and only if, for each object x, H|x is <-linearizable. Note that a compositional property is sometimes called local.

The futures linearizability types described herein may be modeled through extensions to the linearizability model described above. In the descriptions below, it may be assumed that, in these models, thread sub-histories are sequential, but some methods return Future<T> objects, and each such object is evaluated at most once by the thread that created it. For each method m that returns a Future<T> object, it may be assumed there is a corresponding method $\tilde{m}$ that returns a T object, and that the meaning of m is given by the object's sequential specification.

As described below, futures may be modeled through re-writing rules. For example, for a history H, each Future<T> object in H is associated with two method calls: a first call m that creates the future, and a second call that evaluates it, both executed by a thread A. Each such pair may be rewritten as a single call $\tilde{m}$ that returns a value of type T, yielding a new history $\tilde{H}$. While the method call precedence order $<_H$ may be assumed to be total on H|A, the rewritten precedence order $<_{\tilde{H}}$ is not necessarily total on $\tilde{H}$|A. A partial order $<_F$ may be specified to extend $<_{\tilde{H}}$, and with a requirement that $\tilde{H}$ be $<_F$-linearizable. Note that the particular rewriting rule applied may be dependent on whether a strong, medium, or weak futures linearizability policy is in effect. For example, under a strong futures linearizability policy, $\tilde{H}$ may be constructed by replacing m with $\tilde{m}$, treating the future object as a regular variable, and the future evaluation step as a simple assignment. Under this policy, H may be said to be strong futures linearizable if $\tilde{H}$ is $<_{\tilde{H}}$-linearizable. In another example, under a weak futures linearizability policy, $\tilde{H}$ may be constructed by replacing the invocation step of m with the invocation step of $\tilde{m}$, deleting the response step of m, deleting the future evaluation's invocation step, and replacing the future evaluation's response step with the response step of $\tilde{m}$. Under this policy, H may be said to be weak futures linearizable if $\tilde{H}$ is $<_{\tilde{H}}$-linearizable.

In yet another example, under a medium futures linearizability policy, $\tilde{H}$ may be constructed as in the weak futures linearizability example (e.g., by replacing the invocation step of m with the invocation step of $\tilde{m}$, deleting the response step of m, deleting the future evaluation's invocation step, and replacing the future evaluation's response step with the response step of $\tilde{m}$). Under this policy, if $m_0$ and $m_1$ are future creation calls in H by the same thread on the same object, such that $\tilde{m}_0$ and $\tilde{m}_1$ are overlapping in $\tilde{H}$, then they are unordered by weak futures linearizability, but should be ordered by medium futures linearizability. In this example $<_m$ may be defined by strengthening $<\tilde{H}$ to order such calls, as follows:

$$\tilde{m}_0 <_m \tilde{m}_1 \text{ if} \begin{cases} \tilde{m}_0 <_{\tilde{H}} \tilde{m}_1, & \text{or} \\ \tilde{m}_0, \tilde{m}_1 \in \tilde{H}|A \cap \tilde{H}|x \text{ and } m_0 <_H m_1 \end{cases}$$

Under this policy, H may be may be said to be medium futures linearizable if $\tilde{H}$ is $<_m$-linearizable. As previously noted, strong, medium, and weak futures linearizability, as described herein, are all non-blocking and are all compositional.

Computing System

Figure 7:
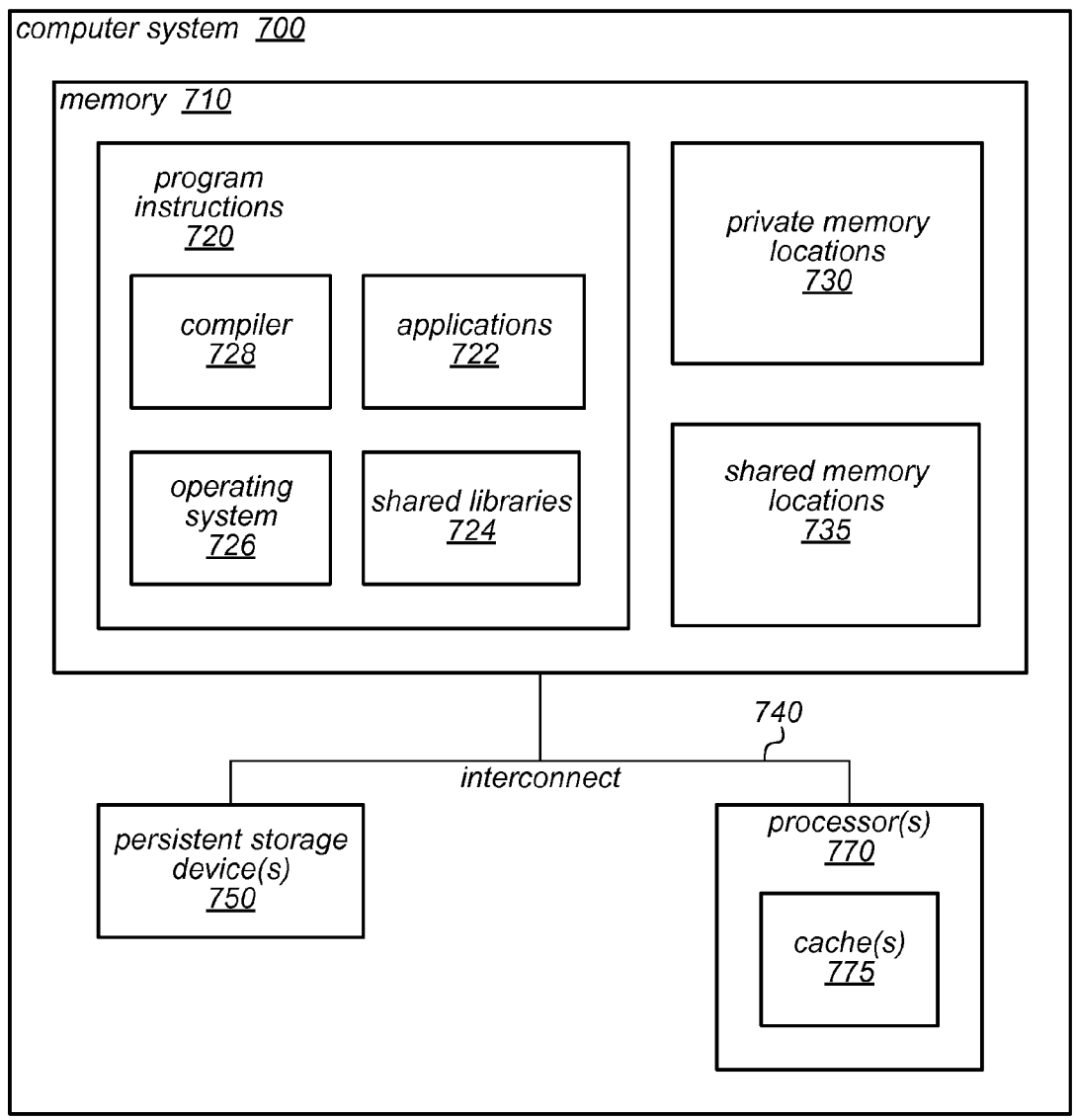
FIG. 7 is a block diagram illustrating one embodiment of a computing system that is configured to implement shared data structures and applications (or computations thereof) that create and use futures (with side effects) when accessing those shared data structures.

The techniques and methods described herein for implementing shared data structures that exploit futures and type-specific optimizations to improve performance may be implemented on or by any of a variety of computing systems, in different embodiments. For example, FIG. 7 illustrates a computing system 700 that is configured to implement shared data structures and applications (or computations thereof) that create and use futures (with side effects) when accessing those shared data structures, according to various embodiments. The computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for creating and using futures to improve the performance of applications that access shared data structures, as described herein, may be provided as a computer program product, or software, that may include a non-transitory, computer-readable storage medium having stored thereon instructions, which may be used to program a computer system 700 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 700 may include one or more processors 770; each may include multiple cores, any of which may be single- or multi-threaded. For example, multiple processor cores may be included in a single processor chip (e.g., a single processor 770), and multiple processor chips may be included in computer system 700. Each of the processors 770 may include a cache or a hierarchy of caches 775, in various embodiments. For example, each processor chip 770 may include multiple L1 caches (e.g., one per processor core) and one or more other caches (which may be shared by the processor cores on a single processor). The computer system 700 may also include one or more persistent storage devices 750 (e.g. optical storage, magnetic storage, hard drive, tape drive, solid state memory, etc.) and one or more system memories 710 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 7 (e.g., video cards, audio cards, additional network interfaces, peripheral devices, a network interface such as an ATM interface, an Ethernet interface, a Frame Relay interface, etc.)

The one or more processors 770, the storage device(s) 750, and the system memory 710 may be coupled to the system interconnect 740. One or more of the system memories 710 may contain program instructions 720. Program instructions 720 may be executable to implement one or more applications 722 (which may include source code and/or executable code for a multithreaded application that exploits futures, and extensions thereof, when accessing shared data structures), shared libraries 724, or operating systems 726. In some embodiments, program instructions 720 may include a compiler 728 (which may be an optimizing compiler). In some embodiments, program instructions 720 may be executable to implement a contention manager (not shown). In some embodiments, program instructions 720 (or more specifically, shared libraries 724) may also be configured to implement a futures support module or a futures support library, which may include methods for implementing shared data structures under various futures linearizability policies, creating and evaluating futures, or performing type-specific optimizations on lists or queues of pending operations (futures), or any other methods that may be invoked by applications 722.

Program instructions 720 may be encoded in platform native binary, any interpreted language such as Java™ byte-code, or in any other language such as C/C++, the Java™ programming language, etc., or in any combination thereof. In various embodiments, optimizing compiler 728, applications 722, operating system 726, and/or shared libraries 724 may each be implemented in any of various programming languages or methods. For example, in one embodiment, optimizing compiler 728 and operating system 726 may be based on the Java programming language, while in another embodiments they may be written using the C or C++ programming languages. Similarly, applications 722 may be written using the Java programming language, C, C++, or another programming language, according to various embodiments. Moreover, in some embodiments, optimizing compiler 728, applications 722, operating system 726, and/shared libraries 724 may not be implemented using the same programming language. For example, applications 722 may be C++ based, while optimizing compiler 728 may be developed using C.

The program instructions 720 may include transactional memory support and/or other functions, operations, or procedures for implementing multithreaded applications that exploit futures (and extensions thereof) when accessing shared data structures, as described herein. Such support and functions may exist in one or more of the shared libraries 724, operating systems 726, or applications 722, in various embodiments. The system memory 710 may further comprise private memory locations 730 and/or shared memory locations 735 where data may be stored. For example, in some embodiments, shared memory locations 735 may store data or other shared resources (e.g., shared data structures, such as stacks, queues, and list-based sets that are operated on using the techniques described herein, or shared queues of pending futures/operations) that are accessible to multiple, concurrently executing threads, processes, or transactions, in various embodiments. In various embodiments, private memory locations 730 and/or shared memory locations 735 may store thread-local lists of pending operations, as described herein, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of shared data structures and particular futures linearizability policies that support creating and using futures to improve the performance of applications that access those shared data structures (including the application of type-specific optimizations), it should be noted that the techniques and mechanisms disclosed herein for creating and using futures to improve the performance of applications that access shared data structures may be applicable in other contexts in which applications access different types of shared data structures than those described in the examples herein and/or in which different futures linearizability policies and/or type-specific optimizations are supported. It is intended that the following claims be interpreted to embrace all such variations and modifications.

What is claimed:

1. A system, comprising:
one or more processor cores; and
a memory coupled to the one or more processor cores;
wherein the memory stores:
 a shared data structure;
 program instructions that when executed on the one or more processor cores cause the one or more processor cores to implement a multithreaded application that invokes a plurality of operations targeting the shared data structure; and
 program instructions that when executed on the one or more processor cores cause the one or more processor cores to implement a futures support module;
wherein to invoke the plurality of operations targeting the shared data structure, one or more threads of the multithreaded application are configured to create two or more pending futures, each pending future being implemented as a future data object indicating a respective operation to be performed on the shared data structure prior to an evaluation of the pending future;
wherein between creation of a given one of the two or more pending futures and evaluation of the given pending future, a component of the futures support module is configured to perform an optimization operation on a collection of pending futures that includes the given pending future;
wherein subsequent to performing the optimization operation on the collection of pending futures, a component of the futures support module is configured to determine one or more respective result values for one or more pending futures of the collection of pending futures, including the given pending future; and
wherein the order in which the one or more respective result values for the one or more pending futures of the collection of pending futures is determined or the optimization operation that is performed on the collection of pending futures is dependent, at least in part, on a futures linearization policy.

2. The system of claim 1, wherein each future data object comprises an element specifying the respective operation to be performed, an element configured to store a result of the respective operation, and an element indicating that the result of the respective operation has been generated or that it has not yet been generated.

3. The system of claim 1, wherein the optimization operation that is performed on the collection of pending futures is dependent on a respective operation type for respective operations indicated in the collection of pending futures.

4. The system of claim 1, wherein the optimization operation comprises an operation to combine respective operations indicated in the two or more pending futures in the collection of pending futures into a single operation to be applied to the shared data structure or to elide the respective operation indicated in each of the two or more pending futures in the collection of pending futures.

5. The system of claim 1, wherein the optimization operation comprises an operation to perform a respective operation indicated in a particular one of the two or more pending futures in the collection of pending futures during an evaluation of another one of the two or more pending futures in the collection of pending futures.

6. The system of claim 1,
wherein to invoke the plurality of operations targeting the shared data structure, each of the one or more threads of the multithreaded application that creates a pending future is configured to store the pending future in a respective thread-local data structure that stores a collection of pending futures; and
wherein the optimization operation is performed on a particular collection of pending futures stored in the respective thread-local data structure.

7. The system of claim 1,
wherein the futures linearization policy is one of multiple futures linearization policies supported in the system; and
wherein the one of the multiple futures linearization policies supported in the system on which the order or the optimization operation is dependent is determined based, at least in part, on a configuration parameter value.

8. The system of claim 1, wherein the futures linearization policy specifies that, for each of the two or more pending futures, the respective operation that targets the shared data structure and that is indicated in the pending future takes effect at a point in time between creation of the pending future and evaluation of the pending future by a thread of the multithreaded application that invoked the respective operation, and wherein the order in which respective operations indicated in the two or more pending futures take effect is arbitrary.

9. The system of claim 1, wherein the futures linearization policy specifies that, for each of the two or more pending futures, the respective operation that targets the shared data structure and that is indicated in the pending future takes effect at a point in time between creation of the pending future and evaluation of the pending future by a thread of the multithreaded application that invoked the respective operation, and wherein respective operations invoked by the same thread of the multithreaded application take effect in the order in which they were invoked.

10. The system of claim 1, wherein the futures linearization policy specifies that, for each of the two or more pending futures, the respective operation that targets the shared data structure and that is indicated in the pending future takes effect at a point in time between creation of the pending future and evaluation of the pending future by a thread of the multithreaded application that invoked the respective operation, and wherein respective operations take effect in the order in which they were invoked by the one or more threads of the multithreaded application.

11. The system of claim 1, wherein to evaluate the one or more pending futures of the collection of pending futures, the futures support module is configured to perform respective operations indicated in the one or more pending futures of the collection of pending futures during a single traversal of the shared data structure.

12. The system of claim 1,
wherein the futures linearization policy is one of multiple futures linearization policies supported in the system;
wherein the memory further stores another shared data structure;
wherein the shared data structure and the other shared data structure are configured in the memory such that the behavior of operations targeting the shared data structure and the behavior of operations targeting the other shared data structure are consistent with the one of the multiple futures linearization policies supported in the system; and
wherein operations collectively targeting the shared data structure and the other shared data structure are also consistent with the one of the multiple futures linearization policies supported in the system.

13. A method, comprising:
performing by one or more computing nodes, each of which comprises at least one processor core and a memory:
 beginning execution of a multithreaded application that comprises a plurality of operations targeting a shared data structure, wherein the shared data structure is accessible by a plurality of threads of the multithreaded application;
 initiating, by a given thread of the multithreaded application, an operation targeting the shared data structure, wherein said initiating comprises creating a pending future, and wherein the pending future is implemented as a future data object specifying the operation to be performed on the shared data structure prior to an evaluation of the pending future;
 in response to said initiating, a futures support module:
  performing an optimization operation on a collection of pending futures that includes the pending future; and
  subsequent to performing the optimization operation on the collection of pending futures, computing results of the plurality of operations specified in one or more pending futures of the collection of pending futures that includes the pending future; and
 wherein the order in which the results of the plurality of operations specified in the one or more pending futures of the collection of pending futures take effect or the optimization operation that is performed on the collection of pending futures is dependent, at least in part, on an applicable futures linearization policy.

14. The method of claim 13, wherein the optimization operation that is performed on the collection of pending futures is dependent on an operation type for one or more operations of the plurality of operations specified in the collection of pending futures.

15. The method of claim 13, wherein the optimization operation comprises an operation to combine operations specified in two or more pending futures in the collection of pending futures into a single operation to be applied to the shared data structure or to elide the operations specified in each of the two or more pending futures in the collection of pending futures.

16. The method of claim 13,
wherein the applicable futures linearization policy is one of multiple futures linearization policies supported in a system;
wherein the method further comprises determining the one of the multiple futures linearization policies supported in the system on which the order or the optimization operation is to be dependent; and
wherein said determining is dependent, at least in part, on a configuration parameter value.

17. A non-transitory, computer-readable storage medium storing program instructions that when executed on one or more computers cause the one or more computers to perform:

beginning execution of a multithreaded application that comprises a plurality of operations targeting a shared data structure, wherein the shared data structure is accessible by a plurality of threads of the multithreaded application;

initiating, by a given thread of the multithreaded application, an operation targeting the shared data structure, wherein said initiating comprises creating a pending future, and wherein the pending future is implemented as a future data object specifying the operation to be performed on the shared data structure during an evaluation of the pending future;

in response to said initiating, a futures support module:
  performing an optimization operation on a collection of pending futures that includes the pending future; and
  subsequent to performing the optimization operation on the collection of pending futures, computing results of the plurality of operations specified in one or more pending futures of the collection of pending futures that includes the pending future; and wherein the order in which the results of the plurality of operations specified in the one or more pending futures of the collection of pending futures take effect or the optimization operation that is performed on the collection of pending futures is dependent, at least in part, on an applicable futures linearization policy.

18. The non-transitory, computer-readable storage medium of claim 17, wherein to invoke the plurality of operations targeting the shared data structure, each of the plurality of threads of the multithreaded application that creates a pending future is configured to store the pending future in a respective thread-local data structure that stores a collection of pending futures; and wherein the optimization operation is performed on the collection of pending futures stored in the respective thread-local data structure.

19. The non-transitory, computer-readable storage medium of claim 17, wherein to invoke the plurality of operations targeting the shared data structure, each of the plurality of threads of the multithreaded application that creates a pending future is configured to store the pending future in a shared queue of pending futures that stores a collection of pending futures; and wherein the optimization operation is performed on the collection of pending futures stored in the shared queue of pending futures.

20. The non-transitory, computer-readable storage medium of claim 17, wherein each pending future in the collection of pending futures comprises a respective key or a timestamp; and wherein the optimization operation comprises an operation to sort pending futures in the collection of pending futures by their respective keys or timestamps.

* * * * *